United States Patent [19]

Joyce et al.

[11] 4,382,296

[45] May 3, 1983

[54] BUFFERING SPEECH SIGNALS IN A TASI SYSTEM

[75] Inventors: Robert H. Joyce, Menlo Park, Calif.; David H. A. Black, Chelsea; Franz O. Plangger, Gatineau, both of Canada

[73] Assignee: Northern Telecom Limited, Ottawa, Canada

[21] Appl. No.: 218,756

[22] Filed: Dec. 22, 1980

[30] Foreign Application Priority Data

Oct. 3, 1980 [CA] Canada ............................. 361497

[51] Int. Cl.³ .............................................. H04J 5/00
[52] U.S. Cl. ...................................... 370/81; 364/514
[58] Field of Search ....................... 370/81; 179/18 J; 364/514

[56] References Cited

U.S. PATENT DOCUMENTS 4,284,850  8/1981  Clingenpeel ........................ 370/81

Primary Examiner—Glen R. Swann, III
Attorney, Agent, or Firm—Birch, Stewart, Kolasch & Birch

[57] ABSTRACT

A time assignment speech interpolation (TASI) system includes a speech buffer comprising storage packets which are assigned to the individual channels as required for the storage of the signals of each off-hook channel. For each inactive channel, the signals are stored sequentially and cyclically in one packet. When the channel becomes active, the sequential storage of signals continues in this and in further packets as required, signals stored before detection that the channel had become active being retained in the first packet to accommodate the response time of a speech detector of the system. Clipping of speech signals is thereby avoided. The channel is assigned a transmission facility and channel-to-facility assignment information is transmitted, following which the signals of the relevant channel are read sequentially from the buffer packets and transmitted via the facility. Freeze-out of speech signals is reduced because there is a variable delay between storage of signals in the buffer and reading therefrom; reading takes place only after a transmission facility has become available and has been assigned to the channel. At the end of each speech burst an end-of-record signal is stored in the buffer following the last signal of the channel; this is detected on reading from the buffer to terminate the reading and to indicate that the facility is available for a new assignment. Rapid updating of packets for writing into and reading from the buffer is achieved by assigning, to each channel or facility for which storage or reading is taking place, not only a current packet of the buffer which is currently being used for storage or reading, but also a back-up packet which is the next packet to be used for the storage or reading operation.

17 Claims, 14 Drawing Figures

BUFFERING SPEECH SIGNALS IN A TASI SYSTEM

This invention relates to a method of buffering speech signals in a time assignment speech interpolation, or TASI, system, and to such a system.

BACKGROUND OF THE INVENTION

In a TASI system, speech bursts on individual channels are detected and interpolated for transmission via fewer transmission facilities than there are channels. Typically there may be twice as many channels as there are facilities. Channel-to-facility assignment information, indicating which channels are assigned to which facilities, is also transmitted via the facilities to a far-end TASI system to enable the received interpolated speech bursts to be correctly supplied to the respective channels.

In order to accommodate the time required for a speech detector to detect the start of a speech burst on a channel, for a processor to assign a free facility to the channel in response to such detection, and for the channel-to-facility assignment to be transmitted, whilst still transmitting the entire speech burst without clipping of the start of the burst, it is known to delay the speech signals of the channel by a fixed period before supplying them to the facility. For example, the TASI system described in Cannon et al. U.S. Pat. No. 4,147,896 issued Apr. 3, 1979 includes 32 ms. fixed delay buffers in this respect. "Freeze-out" occurs in a TASI system in the event that a speech burst is detected on a channel but there is no facility free to which the channel can be assigned; consequently the speech burst is not transmitted. For relatively large numbers of channels and facilities, for example if there are 48 channels and 24 facilities, the probability of freeze-out of individual speech bursts is very small. It is desirable, however, to provide TASI systems capable of operating with relatively small numbers of channels and facilities. As the numbers of channels and facilities decrease, the probability of freeze-out of individual speech bursts increases, so that freeze-out becomes a significant problem in providing such TASI systems.

In order to mitigate the problem of freeze-out, the TASI system described in the Cannon et al. patent, as is more fully described in Clingenpeel U.S. Pat. No. 4,184,051 issued Jan. 15, 1980, includes variable delay buffers in addition to the fixed delay buffers already referred to. In the event that no facility is free for transmission of a speech burst on a channel, the speech signals of the channel are supplied from the relevant fixed delay buffer to one of the variable delay buffers, in which they are stored commmencing at a specific starting address and from which they are read out and transmitted when one of the facilities becomes available. For example, there are two or four such variable delay buffers. Whilst such an arrangement mitigates the problem of freeze-out to a certain extent, it suffers from the disadvantage that the number of variable delay buffers provided, and their capacity, are selected in dependence upon the numbers of channels and facilities connected to the TASI system, so that expansion of the system to accommodate more channels and facilities may necessitate modification of the buffer arrangement. Furthermore, the limited storage capacity of the variable delay buffers can lead to a loss of speech signals in the event that there is a relatively long delay before a facility becomes free. In addition, because the number of variable delay buffers is limited, the problem of freeze-out is not entirely avoided. Thus whenever a speech burst occurs on a channel when no facility is free and each of the variable delay buffers is already in use, then the speech burst is frozen out in the same manner as occurs when no variable delay buffers are present. This is the case even though each of the variable delay buffers may have a very large part of its storage capacity unused. Thus even though each variable delay buffer may have a large storage capacity, this capacity is relatively poorly utilized in attempting to avoid freeze-out.

An object of this invention, therefore, is to provide an improved method of buffering speech signals in a TASI system, and to provide an improved TASI system, which can be used with relatively small or large numbers of channels and facilities without modification of the system, and which provides for storage of speech signals in such a manner that the problems of clipping of speech signals and freeze-out of individual speech bursts can be substantially reduced.

SUMMARY OF THE INVENTION

According to one aspect of this invention there is provided a method of buffering speech signals in a TASI system, comprising, for each channel which is active, the steps of: providing storage packets of a buffer as required for storage of signals of the channel; storing signals of the channel sequentially in said packets; and upon assignment of a transmission facility to the channel for transmisson of the signals of the channel, reading the signals of the channel sequentially from said packets for transmisson via the facility.

As is known in the art, an active channel is a channel in respect of which signals to be transmitted have been detected. Usually, such signals to be transmitted are speech signals of a speech burst on a channel which is connected to a telephone which is off-hook; such a channel is referred to herein, for clarity and convenience, as an off-hook channel. Alternatively, signals to be transmitted may be tone signals which occur in multi-frequency dialling, or they may conceivably be data signals. Conversely, an inactive channel is an off-hook channel in respect of which no signals are currently to be transmitted.

According to another aspect, this invention provides a method of buffering speech signals in a TASI system in which speech signals from a plurality of channels are interpolated for transmission via a lesser plurality of transmission facilities, comprising the steps of: providing a buffer comprising storage packets each for storing a plurality of speech signals of a channel; determining, for each channel, when the channel has become active and when the channel has become inactive; assigning packets of the buffer to each active channel as required for storage of signals of the channel, and storing the signals of the channel sequentially in said packets until it is determined that the channel has become inactive; in response to determination that a channel has become active, assigning the channel to a transmission facility for transmission of signals of the channel via the facility; in response to the assignment of a channel to a facility, reading the signals of the channel sequentially from the packets of the buffer assigned to the channel, for transmission via the facility; and de-assigning the packets of the buffer from the channels in response to reading of the signals of the channels therefrom.

Thus in accordance with this invention, the signals of each active channel are stored sequentially in packets of the buffer which are assigned to the channel as required for the storage of the signals. The small size of the individual buffer packets, in comparison to the size of the variable delay buffers in the prior art, enables the buffer capacity to be used efficiently for both short and long speech bursts. Thus the storage of signals in the buffer takes place regardless of the availability of transmission facilities. Even though at any particular instant no transmission facilities may be available, storage of signals of each channel which is or becomes active continues. It is for these reasons that freeze-out is substantially reduced in comparison to a prior art TASI system, having a similarly sized buffer, operating under similar traffic conditions. Obviously, the number and size of the storage packets of the buffer are selected to be suitable for the capacity of the TASI system.

Upon assignment of a transmission facility to a channel, and hence after a facility has become available for such assignment, reading of the signals of the relevant channel from the packets for transmission via the facility is effected. Thus for each active channel, there is a delay between storage of signals in and reading of signals from the buffer. This delay, being dependent upon the availability of transmission facilities when the channels become active, is widely variable among the different channels and speech bursts on any particular channel, although the delay remains constant once it has been determined for each individual speech burst on each individual channel.

In view of the variable delay which can occur between storing signals in and reading signals from the buffer, it becomes desirable to facilitate determining when to stop reading signals from the buffer for each channel which has been assigned a facility, so that the facility and the packets assigned to the channel are made available for reassignment at the earliest possible opportunity. To this end the method preferably comprises the steps of: in response to determination that a previously active channel has become inactive, storing an end-of-record signal sequentially following the last signal of the channel stored in said packets assigned to the channel; detecting the end-of-record signal on reading the signals of the channel sequentially from the packets of the buffer; and terminating the reading of the signals of the channel in response to such detection. In the case of 8-bit PCM signals on the channels, the end-of-record signal is conveniently the hexadecimal code FF, which is suppressed from the PCM signals.

As in the prior art, it is conceivable that the channel signals could be delayed in fixed delay buffers for the time required by the speech detector to detect the start of a speech burst. Preferably, however, the channel signals are stored in the already-provided buffer packets to accommodate the speech detector response time. To this end the method of the invention preferably further comprises the step of determining, for each channel, whether the channel is off-hook; the steps of assigning packets of the buffer and storing signals in said packets comprise the steps of: in response to determination that a channel has become off-hook, assigning a packet of the buffer to the channel and storing signals of the channel sequentially and cyclically in said packet; and in response to determination that the channel has become active, producing an address which identifies a location in said packet at which a signal of the channel was stored a predetermined time before such determination, continuing to store signals of the channel sequentially in the packet until said location is reached, and then storing signals of the channel sequentially in further packets assigned to the channel as required; and said reading of the signals of the channel is effected sequentially from said location.

Thus signals of all off-hook channels are stored in packets of the buffer. In the case of active channels, packets are sequentially assigned to the channels as required to store the signals without any loss of signals. In the case of each inactive channel, signals are stored sequentially and cyclically in only one packet, signals being successively over-written in the packet so that only the most recent signals are retained. When the channel becomes active, the most recent signals of the channel, which have already been stored, commencing at the predetermined time before the determination that the channel has become active, are retained in the packet, which then continues to be filled with new signals of the channel until said location in the packet is reached. The packet is then full of signals which are to be read from the packet and transmitted via a facility in due course. Accordingly the channel is assigned a new packet into which subsequent signals are written until this is filled and is assigned subsequent packets as required. Reading is effected sequentially from said location in the first packet, so that signals which occurred within the predetermined time before determination that the channel had become active, which signals include the initial signals at the start of the speech burst, are read from the buffer with the remainder of the speech burst. The "new packet" which is assigned to the channel as described above could, if reading from the packet to a facility has already started, be the same packet which is already assigned to the channel. In this case, obviously only a single packet of the buffer is required for the storage of speech signals of the channel because the storage time is less than the time required to write into all storage locations of the packet.

The predetermined time is selected to be equal to or greater than the typical response time of the speech detector, and must obviously be not greater than the time during which the packet would be filled by signals from the channel to which the packet is assigned. As the predetermined time is decreased, the risk that the start of speech bursts will be clipped is increased. Increasing the predetermined time, however, results in a slight increase of the stored signals in the buffer and in the activity (extent to which the transmission facilities are occupied by transmitted speech signals) of the TASI system. For example, in an embodiment of the invention having 256 packets in the buffer, each capable of storing signals of a channel occurring during a period of 32 ms, with a speech detector having a typical response time of 4 ms, the predetermined time was selected to be 8 ms. However, the buffer could have fewer or more packets than this, for storing signals occurring during different periods, with a different speech detector response time and a different predetermined time.

When a packet assigned to an active channel is filled, it is necessary for a new packet to be assigned to the channel very rapidly in order that the next signal on the channel can be stored in the new packet. For example, in the common case of signals on the channels being sampled at a frequency of 8 kHz, a new packet must be assigned in less than 1 frame, or 125 μs, for any individual channel. However, an arbitrary number of channels may require assignment of new packets in any one frame, so that the actual time available for assigning each new packet is much less than this, presenting a significant problem.

In order to overcome this problem, the step of assigning packets of the buffer to the channels preferably comprises the steps of: in response to each assignment of a packet to a channel, providing another, back-up, packet for assignment to the channel; and assigning the back-up packet to the channel when a new packet is required to be assigned to the channel. Thus whenever a new packet is required for a channel, the already provided back-up packet is used to satisfy the requirement that the new packet be assigned to the channel very rapidly. Subsequently (within the next 32 ms in the case where each packet can store speech signals occurring during a 32 ms period) a new back-up packet is provided for the channel, ample time being available for this.

In order to prevent the buffer becoming overoccupied with signals in respect of a channel which has not been assigned a transmission facility, preferably the step of assigning packets of the buffer to each active channel comprises the step of limiting the total number of packets which are assigned to each particular active channel to a predetermined number. This is conveniently achieved by providing for overwriting of the oldest signals of the channel stored in the buffer when the channel has been assigned a predetermined number of packets. Thus in this situation some loss of speech signals occurs. However, this is a very rare situation and accordingly the loss of signals can be tolerated.

According to a further aspect this invention provides a method of buffering speech signals in a TASI system, comprising: assigning a respective storage packet of a buffer to each channel having signals to be buffered; storing signals of the channels in the assigned packets; in response to each assignment of a packet to a channel, providing another, back-up, packet for assignment to the channel; assigning the back-up packet to the channel when another packet is required for continued storage of speech signals of the channel; in response to assignment of a transmission facility to a channel for transmission of signals of the channel, reading the signals of the channel from the packets assigned to the channel for transmission via the facility; and de-assigning the packets from the channels in response to reading of the signals of the channels therefrom.

In order to facilitate providing and assigning back-up packets in respect of each channel, these steps preferably comprise the steps of: providing a flag in a first store; in response to the flag having a first state, storing the identity of a packet, which is to constitute a back-up packet for the channel, in a second store and simultaneously setting the flag to a second state; and when another packet is required for the storage of signals of the channel, provided that the flag in the first store has the second state, assigning the back-up packet whose identity is stored in the second store to the channel and setting the flag to the first state.

According to another aspect this invention provides a TASI system in which speech signals from a plurality of channels are interpolated for transmission via a lesser plurality of transmission facilities, said system comprising: a buffer comprising storage packets each for storing a plurality of speech signals of a channel; detecting means for determining, for each channel, when the channel has become active and when the channel has become inactive; means for assigning packets of the buffer to each active channel as required for the storage of speech signals of the channel, and for storing the speech signals of the channel sequentially in said packets until the channel has become inactive; means responsive to detection that a channel has become active for assigning the channel to a transmission facility for the transmission of speech signals of the channel via the facility, and for transmitting information representing the channel-to-facility assignment; and means responsive to the assignment of a channel to a facility for reading the speech signals of the channel sequentially from the packets of the buffer assigned to the channel and for transmitting them via the facility.

According to a further aspect of the invention there is provided a TASI system in which speech signals from a plurality of channels are interpolated for transmission via a lasser plurality of transmission facilities, said system comprising: detecting means for detecting, for each off-hook channel, whether the channel is active or inactive; a buffer comprising a substantially greater number of storage packets than there are channels, each storage packet being capable of storing all of the signals of one channel which occur during a period substantially greater than a typical response time of the detecting means; means for storing the signals of each channel which is inactive in a respective packet of the buffer, said signals being stored sequentially and cyclically in said packet; means responsive to the detecting means detecting that a channel which has been inactive has become active for producing an address which identifies a location in said respective packet at which a signal of the channel was stored a predetermined time, greater than said typical response time, before such detection; for continuing to store signals of the channel sequentially in said respective packet until said location is reached, and for subsequently storing the signals of the channel sequentially in further packets of the buffer; means responsive to the detecting means detecting that a channel which has been active has become inactive for storing an end-of-record signal sequentially following the last signal of the channel stored in said packets; means responsive to the detection that the channel has become active for assigning the channel to a transmission facility for transmission of signals of the channel via the facility, and for transmitting information representing the channel-to-facility assignment; means responsive to the assignment of the channel of the facility for reading the stored signals of the channel sequentially from the respective packets of the buffer, commencing from said location, and for transmitting them via the facility; and means for detecting the end-of-record signal in the signals read from the buffer and for terminating the reading of signals from the buffer and the transmission of said signals via the facility in response to detection of the end-of-record signal.

In order to comply with the need, already described, to update packets of active channels very quickly as required, preferably the system comprises a first random access memory for storing an address of the storage packet (current packet) of the buffer into which the signals of each off-hook channel are currently being entered; and a second random access memory for storing an address of the next packet (back-up) packet into which the signals of each off-hook channel which is active will be entered when no more signals can be stored sequentially in the current packet of the channel; the means for storing the signals of each off-hook channel comprises means for reading the current packet address of the channel from said first memory and for addressing the buffer with said address; means for detecting when a further packet is required for the continued sequential storage of the signals of a channel and, in response to such detection, for reading the back-up packet address of the channel from said second memory and entering it into said first memory as a new current packet address of the channel; and means responsive to the reading of the back-up packet address of the channel from said second memory for storing a new back-up packet address for the channel in said second memory.

To facilitate updating of packets the system preferably comprises a third random access memory for storing a flag, and in respect of each channel: said means for storing a new back-up packet address in said second memory is responsive to the flag having a first state to effect such storage and simultaneously to set the flag to a second state; and the means for entering the back-up packet address from the second memory into the first memory is arranged to effect such entry only when the flag has the second state, and is arranged to set the flag to the first state upon such entry.

The first and second memories are conveniently used in a similar manner for storing current and back-up packet addresses for reading the signals from the buffer for transmission via the respective facilities. The third memory can simularly be used in respect of the facilities as well as the channels.

BRIEF DESCRIPTION OF THE DRAWINGS

The invention will be further understood from the following description with reference to the accompanying drawings, in which.

DESCRIPTION OF THE PREFERRED EMBODIMENTS

Figure 1:
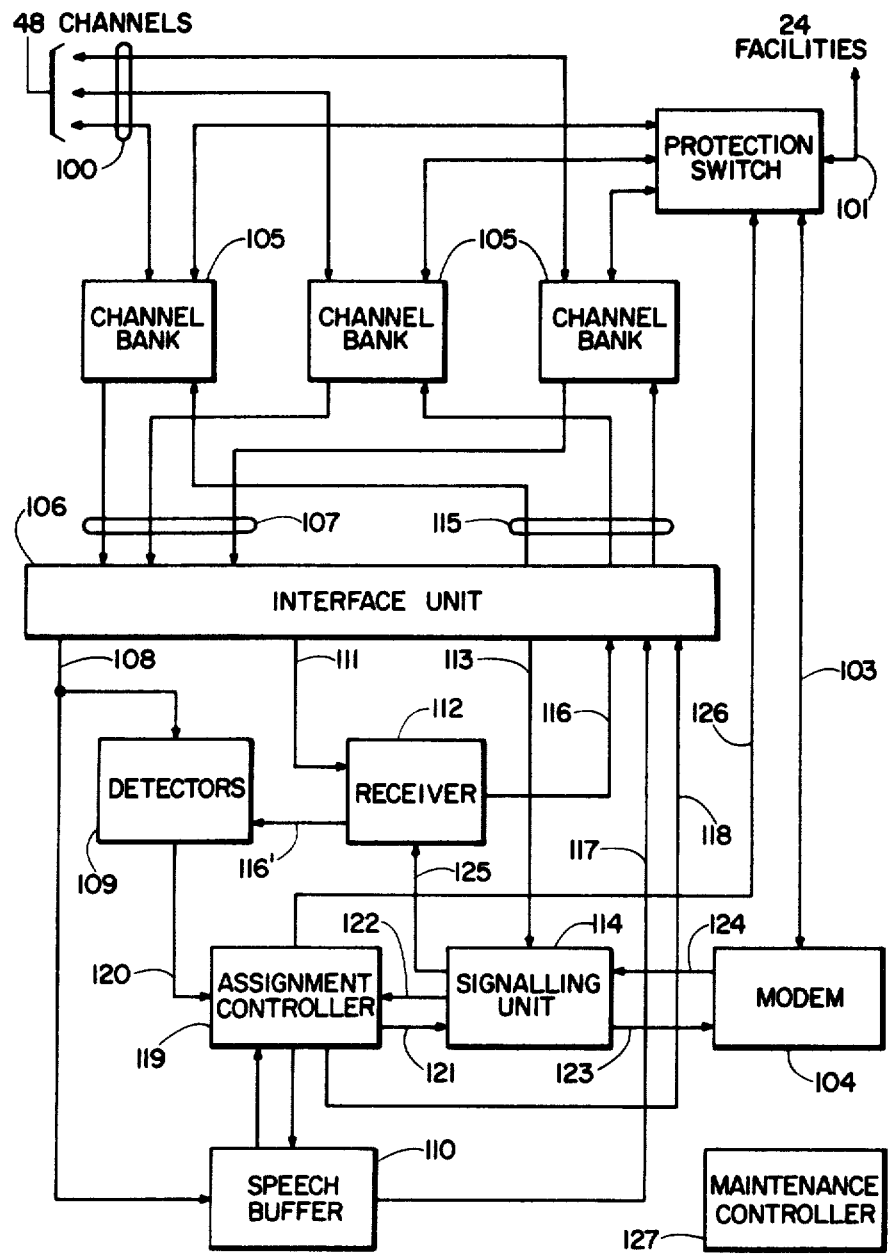
FIG. 1 shows in a block diagram a TASI system incorporating an embodiment of the invention.

FIG. 1 shows in a block diagram a TASI system which enables transmission of signals from up to 48 telephone channels 100, connected for example to a PABX (not shown), via up to 24 transmission facilities 101, e.g. telephone tie-lines connected at their far end (not shown) via another, similar, TASI system to another PABX. A protection switch 102 connects a selected one of the facilities 101, referred to herein as the order wire, via a line 103 to a 2.4 kb/s modem 104 as is further described below. The facilities 101 are coupled via the protection switch 102, and the channels 100 are coupled directly, to up to three channel banks 105, to each of which channel banks up to 16 channels 100 and up to 8 facilities 101 are connected. The channel banks 105 couple the channels 100 and facilities 101 to an interface unit 106.

Each channel bank 105 operates in known manner to convert between bi-directional voice frequency signals, on the channels 100 and facilities 101 to which it is connected, and two unidirectional 1.544 Mb/s digital bit streams (in the standard DS1 format) on lines leading to and from the interface unit 106. The use of each channel bank 105 for up to 16 channels and 8 facilities, rather than connecting all of the facilities to one channel bank and all of the channels to the other two channel banks, renders the TASI system readily adaptable to a wide range of requirements. Thus only one channel bank 105 can be used to transmit signals from up to 16 channels 100 via up to 8 facilities 101, or only two channel banks 105 can be used to transmit signals from 17 to 32 channels 100 via 9 to 16 facilities 101, or all threee channel banks 105 can be used to transmit signals from 33 to 48 channels 100 via 17 to 24 facilities 101. In the following description it is assumed that 48 channels and 24 facilities are present, but it should be understood that this need not be the case.

The interface unit 106 is thus supplied via lines 107 with three incoming digital bit streams containing speech signals and signalling information from the channels 100 and speech signals from the facilities 101. The interface unit 106, as described in more detail below, supplies the speech signals from the channels 100 via lines 108 to a plurality of detectors 109 and a speech buffer 110, supplies the speech signals from the facilities 101 via lines 111 to a receiver 112, and supplies the signalling information from the channels 100 via a line 113 to a signalling unit 114. The interface unit 106 also supplies to the channel banks 105 via lines 115 three outgoing digital bit streams containing speech signals and signalling information for the channels 100 and interpolated speech signals for the facilities 101. The speech signals and signalling information for the channels 100 are supplied combined with one another from the receiver 112 via lines 116, as further described below. Interpolated speech signals for the facilities 101 are supplied to the interface unit 106 from the speech buffer 110 via lines 117. The signalling information for the channels 100 can be over-ridden by simulated signalling information signals supplied to the interface unit 106 via a line 118 from an assignment controller 119.

The interface unit 106 includes a 6.176 MHz crystal controlled oscillator, from which timing signals are derived for controlling the various parts of the TASI system. These timing signals, and various control signals, are supplied between the parts of the system via lines which are not shown in FIG. 1 for the sake of clarity. In particular, these timing signals control the timing of the 1.544 Mb/s bit streams transmitted between the channel banks 105 and the interface unit 106. As is known, these bit streams consist of 125 μs frames each comprising a frame bit and an 8-bit signal sample of each of 24 voice frequency channels. During each frame, the interface unit 106 supplies to the lines 108, and receives from the lines 116, an 8-bit signal sample in respect of each of the 48 channels 100, each 8-bit signal sample being presented in parallel on the lines 108 or 116 during a 2.6 μs period during which the interface unit produces a 6-bit address ADD which identifies the respective channel. Similarly, during each frame the interface unit 106 supplies to the lines 111, and receives from the lines 117, an 8-bit parallel signal sample in respect of each of 23 of the 24 facilities 101, each sample being presented on the lines 111 or 117 during a 5.2 μs period during which 5 of the 6 bits of the address ADD identify the respective facility 101.

Under the control of the assignment controller 119, speech bursts from the 48 channels on the lines 108 are buffered and interpolated by the speech buffer 110 to produce interpolated speech signals on the lines 117. The detectors 109, each of which is time-shared among the 48 channels under the control of the address ADD, serve to supply via lines 120 to the assignment controller 119 signals ACT and DAT which indicate respectively whether each channel is active and whether each channel is carrying data. To this end the detectors 109 comprise a data detector for detecting data signals on the lines 108; in response to detected data the signal DAT is produced and the assignment controller 119 assigns the respective channel permanently to one of the facilities 101 to effect transmission of the data without interpolation with speech bursts, until the end of the data signals. The detectors 109 also comprise a speech detector for detecting speech signals on the lines 108, and an echo detector for detecting whether such speech signals are echoes of signals on lines 116', which signals correspond to signals on the lines 116 as further described below. The signal ACT is produced, representing that a channel is active or is carrying speech to be transmitted, if speech signals which are not echoes are detected.

The buffering by the speech buffer 110 serves to delay signal samples to be transmitted for a short time to accommodate the response time of the speech detector without clipping of speech signals, to allow time for a free facility 101 to be found, and to allow time for channel-to-facility assignment information, which indicates to the TASI system at the far end of the facilities 101 which channel is assigned to which facility for each speech burst, to be transmitted via the order wire at the start of each speech burst.

The assignment controller 119 supplies channel-to-facilty assignment information to the signalling unit 114 via lines 121. Channel signalling (e.g. dial pulsing) information is supplied to the signalling unit 114 via the line 113, and after at least partial correction of faults, e.g. due to contact bounce of electromechanical devices to which the channels 100 may be connected, this signalling information is forwarded to the assignment controller 119 via a line 122. The signalling unit 114 serves for transmitting both the channel-to-facility assignment information and channel signalling information via a line 123, the modem 104, the line 103, the protection switch 102, and the selected one of the facilities 101 which constitutes the order wire.

Information transmitted via the order wire from the far end TASI system is supplied via the protection switch 102, line 103, modem 104, and a line 124 to the signalling unit 114. Via lines 125, received channel signalling and assignment information is used to enagle the receiver 112 to produce the signals on the lines 116 for transmission on the channels 100 from the interpolated signals received via the lines 111. The protection switch 102, as already described, couples the line 103 to the facility 101 which is selected to constitute the order wire. The switch 102 can comprise relays or other suitable switching devices. Any one of the facilities 101 can be selected as the order wire.

As the present invention is concerned with the operation of the speech buffer 110, rather than the manner in which this information is transmitted via the order wire, the signalling unit 114 is not described further here. This unit and the transmission of information via the order wire from the subject of co-pending U.S. patent application Ser. No. 218,683, entitled "TASI System Including an Order Wire", filed simultaneously herewith. Similarly, further description of the detectors 109 is not necessary here.

In addition to the units already briefly described, the TASI system comprises a maintenance controller 127, which is connected to various other parts of the system, such as the receiver 112, the signalling unit 114, and the assignment controller 119, via lines which are not shown in FIG. 1 for the sake of clarity. The maintenance controller 127 carries out routine procedures such as measurement and testing of the facilities 101 to determine, for example, noise and signal levels on the facilities. As these routine procedures are not essential for operation of the TASI system and are not directly relevant to the present invention, the maintenance controller 127 and its operation are not described further here.

Figure 2:
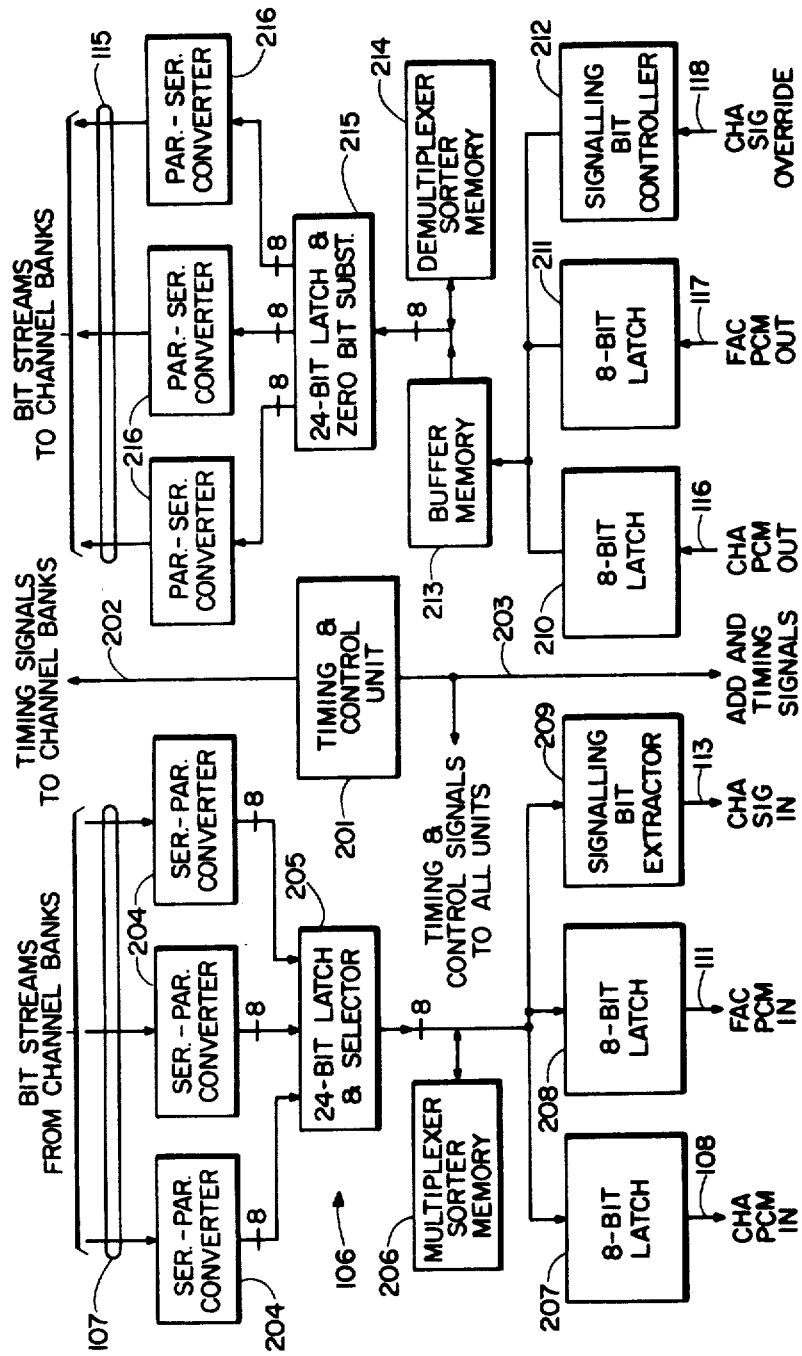
FIG. 2 ilustrates an interface unit of the system.

The interface unit 106, which is shown in more detail in FIG. 2, includes a timing and control unit 201 which includes the crystal-controlled oscillator already referred to and which supplies timing signals to the channel banks 105 via lines 202, the address ADD and timing signals to the rest of the TASI system via lines 203, and timing and control signals including the address ADD to other parts of the unit 106. As shown to the left of the unit 201 in FIG. 2, the interface unit 106 comprises three serial-to-parallel converters 204, a 24-bit latch and selector 205, a multiplexer sorter memory 206, two 8-bit latches 207 and 208, and a signalling bit extractor 209, for producing signals on the lines 108, 111, and 113 from the bit streams on the lines 107. As shown to the right of FIG. 2, the interface unit 106 comprises two 8-bit latches 210 and 211, a signalling bit controller 212, a buffer memory 213, a demultiplexer sorter memory 214, a 24-bit latch and zero bit substitution circuit 215, and three parallel-to-serial converters 216 for producing the bit streams on the lines 115 from the signals on the lines 116 to 118. Each of the memories 206, 213, and 214 is constituted by a random access memory (RAM). All of the units 204 to 216 are controlled by the timing and control unit 201 to operate as described below.

Each serial bit stream on a line 107 is converted by a respective converter 204 into 8-bit parallel PCM words occurring approximately every 5.2 $\mu$s. The three 8-bit words produced simultaneously every 5.2 $\mu$s by the converters 204 are latched by the latch and selector 205 and are entered sequentially, one work at a time, into the memory 206. During the next 125 $\mu$s frame, during each of the 48 addresses ADD each lasting 2.6 $\mu$s the 8-bit PCM word stored in the memory 206 for the respective one of the 48 channels 100 is read out from the memory 206 and via the 8-bit latch 207 to the lines 108. Also during this frame, the 8-bit PCM word stored in the memory 206 for each of the facilities 101, which are also identified by the addresses ADD, is read out from the memory 206 via the 8-bit latch 208 to the lines 111. The signalling bit extractor 209 extracts the signalling bits from the 8-bit words read out from the memory 206 in respect of the channels 100 and produces these serially on the line 113.

Conversely, 8-bit PCM words, which include signalling information, on the lines 116 destined for the channels 100, and 8-bit PCM words on the lines 117 destined for the facilities 101, are supplied during the respective addresses ADD via the latches 210 and 211 respectively and the buffer memory 213 and are entered into the memory 214. The signalling bits contained in the words on the lines 116 can be modified by the assignment controller 119, as described above, via the line 118 and the signalling bit controller 212. The buffer memory 213 provides a delay of almost 1 frame (125 µs) to provide the PCM words at the correct times for writing into the memory 214. During the next frame, the words are read out from the memory 214 sequentially to the circuit 215, from which the words are supplied three at a time to the three converters 216 to produce the three serial bit streams on the lines 115.

Figure 3:
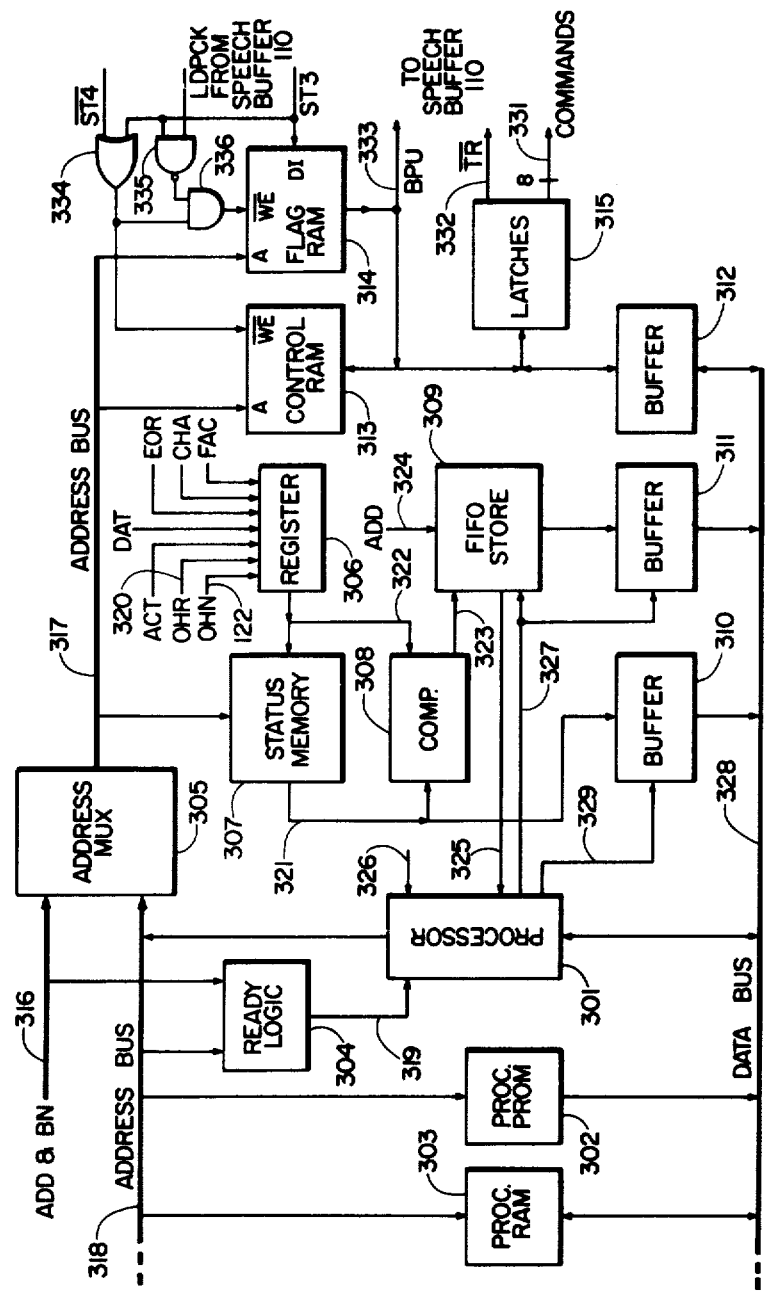
FIG. 3 illustrates part of an assignment controller of the system.

FIG. 3 shows part of the assignment controller 119, which includes a processor 301, associated program and data memories constituted respectively by a PROM 302 and a RAM 303, a ready logic unit 304, an address multiplexer 305, a register 306, a status memory 307, a comparison logic unit 308, a first-in first-out (FIFO) store 309, buffers 310 to 312, a control RAM 313, a flag RAM 314, and latches 315. FIG. 3 also shows gates 334 to 336 to illustrate the manner in which the RAMs 313 and 314 are controlled. Other parts of the assignment controller 119, for example associated with control of the signalling unit 114, are not shown or described here.

The processor 301 is an Intel type 8085A microprocessor which is supplied with a 9 MHz clock signal to operate asynchronously with respect to the address ADD and a bit number BN which are supplied via a bus 316 to the address multiplexer 305. The bit number BN is a 3-bit number which identifies the 8 clock periods of a 3.088 MHz clock signal, produced by the interface unit 106, which occur during the 2.6 µs period of each address ADD. During so-called processor access times, which are the 4th and 8th of these clock periods, the multiplexer 305 supplies to an address bus 317 addresses which are supplied by the processor 301 and which are present on an address bus 318. At other times the multiplexer 305 supplies the address AND from the bus 316 to the address bus 317. In the event that the processor 301 supplies to the bus 318 an address which is destined for the address bus 317 at a time other than during a processor access time, or too late during a processor access time for the addressing operation to be completed before the end of the processor access time, this is detected by the ready logic unit 304 which via a line 319 stops the processor 301 until the next processor access time.

During each address ADD on the bus 316, the register 306 is supplied with and stores status signals OHN, OHR, ACT, DAT, EOR, CHA, and FAC, these signals subsequently being stored for each channel in the status memory 307 at the address AND supplied via the bus 316, multiplexer 305, and address bus 317. The signals ACT and DAT have already been described. The signal OHN denotes the hook status of the rear end subscriber of the channel, and is constituted by the signal on the line 122. The signal OHR denotes the hook status of the far end subscriber of the channel, and is supplied via a line 320 from the receiver 112. The signal EOR is supplied by the speech buffer, as described below. The signal CHA denotes whether a channel unit for the channel having the address ADD is present in one of the channel banks 105. Similarly the signal FAC denotes whether a channel unit for the facility 101 having the address ADD is present in one of the channel banks 105.

The comparison logic unit 308 comprises a plurality of Exclusive-OR gates and NAND gates which, for each address ADD, compare the previously stored status signals supplied from the status memory 307 via lines 321 with the current status signals supplied by the register 306 via lines 322. In the event of there being any difference between the compared status signals the unit 308 supplies a load signal via a line 323 to the store 309. In response to the load signal the store 309 stores the address ADD, with which it is supplied via lines 324, and supplies an interrupt signal via a line 325 to the processor 301. Meanwhile the new status signals are stored in the status memory 307. An exception to this sequence occurs in the case of dial pulsing; in this situation after an initial interrupt signal has been supplied to the processor 301 via the line 325 in response to the signal OHN changing to indicate that the channel's subscriber is off hook, the generation of further load signals on the line 323 in respect of this channel is suppressed within the logic unit 308 for a predetermined period, thereby allowing time for dialling without generating an excessive number of interrupts to the processor due to the dial pulses. This suppression is effected by means of one of the NAND gates in the unit 308 as described above. A similar suppression can be effected in the same manner in respect of other status signals, as desired.

The processor 301 handles interrupt signals supplied via the line 325, and higher priority interrupt signals supplied from the signalling unit 114 via a line 326, in order of priority and in its own timing. In response to an interrupt signal on the line 325, the processor 301 supplies a read signal via a line 327 to the store 309 and the buffer 311, in response to which an address ADD corresponding to a channel number is read out from the store 309 via the buffer 311 and a data bus 328 to the processor 301. The processor 301 adds to the read-out address a prefix addressing the status memory 307, and during the next processor access time addresses the status memory 307 via the address bus 318, multiplexer 305, and address bus 317, and supplies an enable signal to the buffer 310 via a line 329. In consequence the new status signals for the particular channel are read out from the status memory 307 via the lines 321 and the buffer 310 to the data bus 328. The processor 301 also addresses its RAM 303 to read out a previously stored record of the channel's status signals, and compares these with the new status signals from the status memory 307 to determine which signal has changed. The processor 301 then stores the new status signals in its RAM 303 in place of the previously stored status signals.

The processor 301 stores signals in queues in its RAM 303 in dependence upon the change in the status signals. For example, if the signal ACT has changed indicating that a channel which is off-hook has become active, the channel number is stored in a queue of channels awaiting assignment of a facility; on assignment of a facility the processor 301 controls the speech buffer 110 for reading as described below. Control commands and packet numbers, which are described below, for each channel and each facility are supplied by the processor 301 via the data bus 328 and the buffer 312 and are stored in the control RAM 313 at addresses supplied by the processor via the address bus 318, multiplexer 305, and address bus 317 to address inputs A of the control RAM 313. Each write-in to the control RAM 313 by the processor 301 takes place during a processor access time, when a signal $\overline{ST4}$ supplied to the gate 334 is zero to enable the RAM 313 via its write-enable input WE. These commands, including a signal $\overline{TR}$, and packet numbers are supplied from the RAM 313 to the speech buffer 110 via the latches 315 and lines 331 and 332 at the required times as further described below.

During each processor access time the flag RAM 314 is also addressed with the same address which is supplied to the control RAM 313, and is enabled for write-in by the signal $\overline{ST4}=0$ being supplied via the gates 334 and 336 to its write enable input $\overline{WE}$. At this time a signal ST3, which is also described below and is supplied to a data input DI of the flag RAM 314, is zero. This arrangement thus provides that, for each writing of a packet number by the processor 301 into the control RAM 313, a logic zero is written into the flag RAM 314 at a corresponding address. (The same applies with respect to commands written into the control RAM 313, but this is immaterial.) At certain times other than during processor access times, when the signals ST3 and $\overline{ST4}$ are both a logic 1 and the flag RAM 314 is addressed using the channel or facility address prevailing on the bus 316, writing into the flag RAM 314 of a logic 1 at the relevant addresses is controlled by a signal LDPCK, described below, supplied from the speech buffer 110 via the gates 335 and 336 to control the input WE of the RAM 314. Thus bits within the flag RAM 314 are set to zero automatically when the processor 301 writes into the control RAM 313, and can be set to a logic 1 by the speech buffer 110. Each of these bits constitutes a signal BPU, the function of which is described below, which is supplied to the speech buffer 110 via a line 333, for each channel and each facility at the required times, and which can be read by the processor 301 via the buffer 312 and the data bus 328 during processor access times.

Figure 4A:
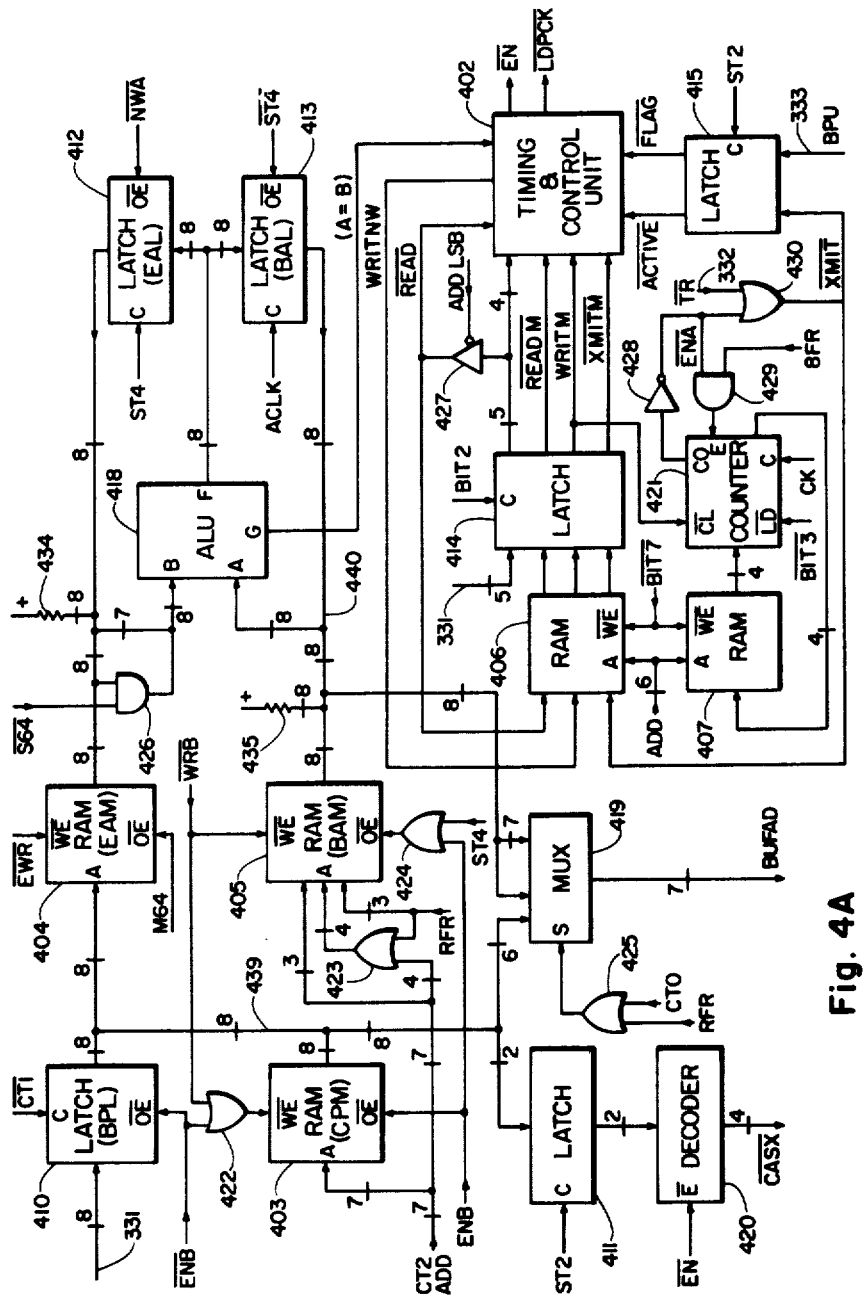
FIGS. 4A and 4B illustrate a speech buffer of the system.
Figure 4B:
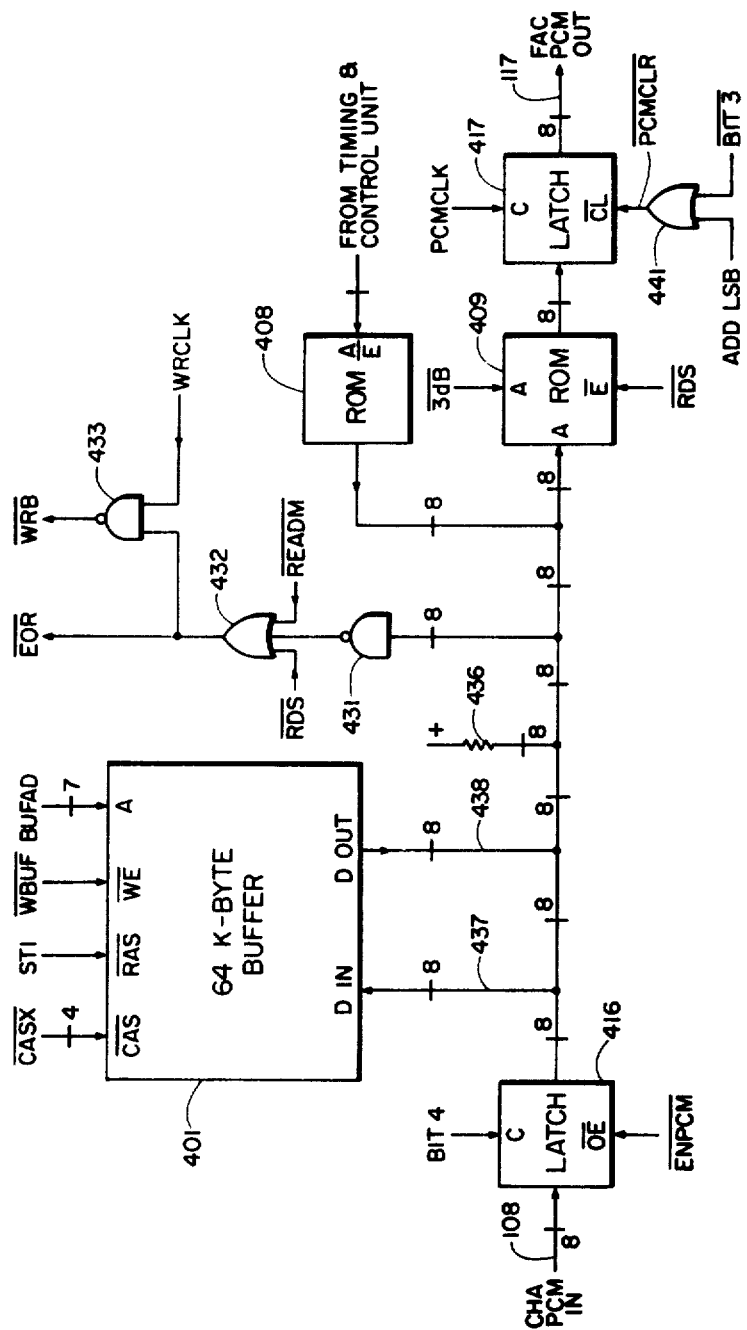
Figure 5:
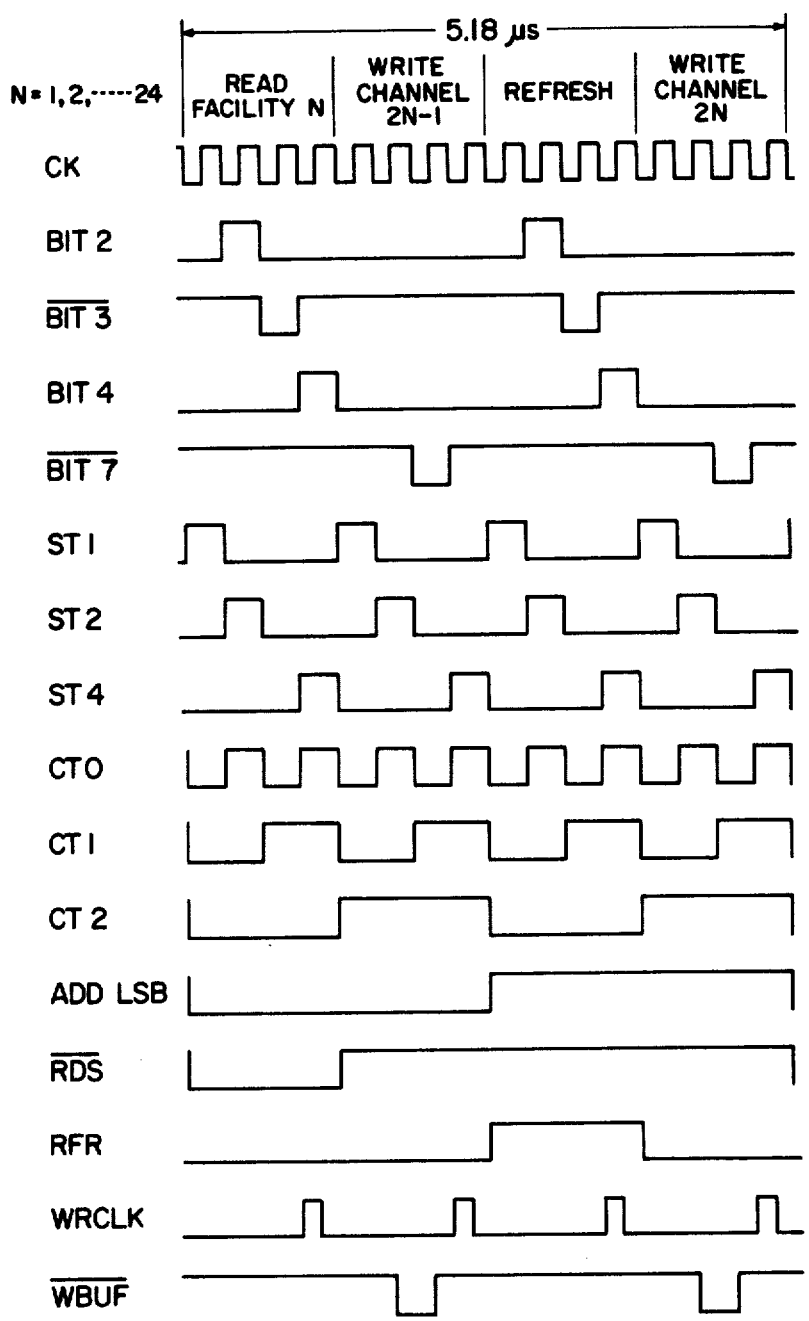
FIGS. 5 and 6A to 6D show timing signals relating to the operation of the speech buffer.

The speech buffer 110 is shown in more detail in FIGS. 4A and 4B, and comprises a 64 k-byte buffer 401, a timing and control unit 402, RAMs 403 to 407 having address inputs A, write-enable inputs $\overline{WE}$, and output-enable inputs $\overline{OE}$, ROMs 408 and 409 having address inputs A and enable inputs $\overline{E}$, latches 410 to 417 having clock inputs C and output-enable inputs $\overline{OE}$, an arithmetic logic unit (ALU) 418 having inputs A and B and outputs F and G, a multiplexer 419 having a selection input S, a 2-to-4-line decoder 420 having an enable input $\overline{E}$, a 4-bit counter having a load input $\overline{LD}$, a clock input C, a clear input $\overline{CL}$, an enable input $\overline{E}$, and a carry output CO, gates 422 to 433 and 441, and pull-up resistors 434 to 436. Multiple lines are designated by a bar on the line with an adjacent numeral indicating the number of lines. Various control and timing signals indicated in FIGS. 4A and 4B are illustrated in FIGS. 5 and 6 and are referred to below.

The buffer 401 consists of 32 2-k-byte type 4116 RAMs arranged in four rows each of 8 RAMs, whose data inputs and data outputs are connected to the 8 input and output lines 437 and 438, respectively, of the buffer. The 8 RAMs of any one row of the buffer 401 can be selected and enabled for reading or writing by making a respective one of the signals $\overline{CASX}$, where X=1, 2, 3, or 4, a logic 0. Each type 4116 RAM has $2^{14}$ storage locations, one of which is selected for reading or writing by two 7-bit addresses BUFAD supplied sequentially by the multiplexer 419. Thus 16 bits are required in total to address each set of 8 bit locations (one bit location in each RAM in a row of the buffer 401) in the buffer 401. These 16 bits are constituted by an 8-bit so-called packet number on a so-called packet bus 439, and an 8-bit so-called byte address on a so-called byte address bus 440. Two bits of the packet number are latched by the latch 411 and decoded by the decoder 420 to produce the relevant signal $\overline{CASX}=0$, the other 6 bits of the packet number and one bit of the byte address constitute the first 7-bit address BUFAD selected by the multiplexer 419, and the remaining 7 bits of the byte address constitute the second 7-bit address BUFAD selected by the multiplexer 419. Thus the buffer 401 can be regarded as storing $2^8=256$ packets each of $2^8=256$ bytes each having 8 bits. Each byte serves to store one 8-bit PCM speech sample; as speech samples on any channel occur every 125 $\mu$s, it follows that one packet of the buffer 401 can store speech samples occurring on any channel over a period of $256\times 125$ $\mu$s$=32$ ms.

In order to accommodate the response time, typically 4 ms, of the speech detector, without clipping the speech signals, the speech buffer is arranged to store continuously speech signals of all channels which are off-hook. In the event that a speech burst starts on an off-hook channel, the signal ACT is produced after a delay of typically 4 ms from the start of the speech burst. The speech buffer is arranged to have already stored the 64 speech samples of the channel which occur within this response time and an additional guard time of 4 ms, and in response to the signal $\overline{TR}=0$, produced by the assignment controller in response to the signal ACT, is arranged to continue storing speech samples for the channel. On assignment of a facility for transmission of the speech burst, the speech buffer is arranged to read out in the relevant time slots the stored speech samples commencing with the 64 speech samples at the start of the speech burst. At the end of a speech burst, an end-of-record (EOR) signal is stored in the speech buffer following the last stored speech sample. This signal is detected upon read-out and is used to terminate reading and to inform the assignment controller accordingly.

The assignment controller, assigns to each off-hook channel a respective packet in the buffer 401. For each channel speech samples are stored in the assigned packet at a byte address which is updated (decremented) each 125 $\mu$s frame. For each channel for which the signal $\overline{TR}=1$, i.e. for each channel which is off-hook but not active, the assigned packet remains the same so that with constant decrementing of the byte address samples are over-written in the packet, only the most recent 256 samples ($=32$ ms) being stored. For each channel for which the signal $\overline{TR}=0$, i.e. for each active channel whose samples are to be transmitted, such overwriting of samples is not permissible so that, when the currently assigned packet is full, a new packet must be assigned to the channel. As such a new packet must be assigned immediately to avoid loss of speech samples, the assignment controller also assigns to each channel a back-up packet, which is used as the new packet when required and is then updated. Thus storage of speech samples is effected in successive packets. Similarly, reading of speech samples to the respective facility is effected from the successive packets, for which purpose the facility is assigned the relevant current and back-up packets. This brief description of writing into and reading from the buffer 401 is expanded below.

During each 125 $\mu$s frame, comprising a frame bit and 24 periods each of 5.18 $\mu$s, it must be possible to write into the buffer a sample in respect of each of the 48 channels and to read from the buffer a sample in respect to each of the 24 facilities. In addition, the buffer 401 must be refreshed periodically. In order to fulfill these requirements, each 5.18 μs period, one of which is represented in FIG. 5, is divided up into two write cycles, a read cycle identified by a signal $\overline{\text{RDS}}=0$, and a refresh cycle identified by a signal RFR=1. Each cycle is divided into four states 1 to 4 identified by signals ST1 to ST4 respectively, and each consecutive two cycles are divided into eight bit periods of a 3.088 MHz clock CK identified by signals BIT1 to BIT8. FIG. 5 shows the clock CK and the signals BIT2, $\overline{\text{BIT3}}$, BIT4, $\overline{\text{BIT7}}$, ST1, ST2, and ST4. The clock CK is divided in frequency to produce signals CT0, CT1 and CT2. The signal CT2 together with the 6-bit address ADD, the least significant bit ADD LSB of which is shown in FIG. 5, form a 7-bit address which identifies each read and write cycle in the frame. FIG. 5 also shows signals WRCLK and $\overline{\text{WBUF}}$ referred to below. The signal ST4=1 identifies the processor access times already referred to.

During the bit 1 period of each 6-bit address ADD the control RAM 313 in the assignment controller 119 is addressed to read out a command word to the latches 315 and thence via the lines 331 to the latch 414. At the start of the bit 2 period, with the signal BIT2=1, 5 bits of this command word are latched in the latch 414, together with signals $\overline{\text{READ}}$, WRITNW, and $\overline{\text{XMIT}}$ from the previous frame which have been delayed by one frame in the RAM 406, and which at the outputs of the latch 414 produce signals $\overline{\text{READM}}$, WRITM, and $\overline{\text{XMITM}}$ respectively. During even-numbered addresses ADD with the signal ADD LSB=0, the command word contains the signal $\overline{\text{READ}}$ which is produced at the output of the strobed buffer 427. With the signal ST2=1 produced during each read and write cycle, the signal BPU read out from the flag RAM 314 and the signal XMIT are latched in the latch 415 to produce at its output signals $\overline{\text{ACTIVE}}$ and $\overline{\text{FLAG}}$ respectively. Assuming that a signal $\overline{\text{ENA}}$ produced at the output of the inverter 428 is 0, the signal $\overline{\text{XMIT}}$ is the same as the signal TR produced by the assignment controller on the line 332. During the signal ST2=1 in each read and write cycle, the control RAM 313 is addressed to read out the respective back-up packet number for the facility or channel via the latches 315 and lines 331, this being latched in the back-up packet latch (BPL) 410 at the end of the bit 2 or bit 6 period with the signal $\overline{\text{CT1}}$.

Thus for each read and write cycle, the BPL stores the assigned back-up packet number. The RAM 403 stores the current packet number assigned to each channel and each facility, and is referred to as the current packet memory (CPM). The RAM 405 stores the current byte address for each read and write cycle, and is referred to as the byte address memory (BAM). The RAM 404 stores for each packet an end address which, for reading and for writing in the case of an active channel, is the last address to be used in the relevant packet, and is referred to as the end address memory (EAM). The latches 412 and 413 are referred to as the end address latch (EAL) and the byte address latch (BAL) respectively.

Having described the speech buffer 110 in general terms, its operation is described in detail below. As writing into and reading from the buffer 401 occur independently of one another, they are described separately, the writing operations being described first.

1. Channel on-hook or not used

The assignment controller 119 supplies, as one of the 5 bits of the command word latched in the latch 414 during the address ADD of the channel, a signal $\overline{\text{WRCLR}}=0$; at other times when the channel is off-hook, this signal $\overline{\text{WRCLR}}=1$. In response to this signal $\overline{\text{WRCLR}}=0$ the timing and control unit 402, which includes a ROM (not shown), produces and supplies to the decoder 420 the signal $\overline{\text{EN}}=1$. In consequence, all of the signals $\overline{\text{CASX}}$ remain a logic 1 so that the buffer 401 is not enabled for writing. The unit 402 also produces the signal WRITNW=0, so that the delayed signal WRITM=0 clears the counter 421. Consequently the carry output of the counter 421 is a logic 0 to produce the signal $\overline{\text{ENA}}=1$.

2. Channel goes off-hook

Figure 6A:
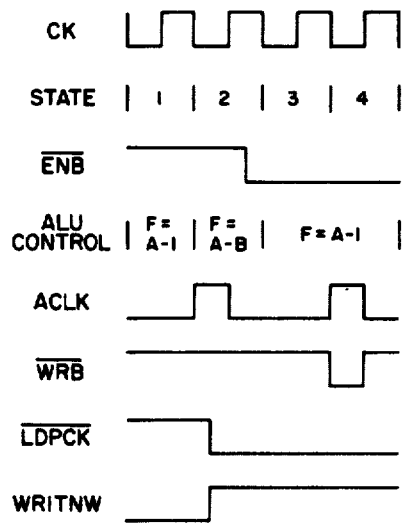

An interrupt is generated, as already described. Upon servicing the interrupt the processor 301 stores the number of a packet into which samples can be written, at the relevant channel address in the control RAM 313 as already described. At the same time, as described above, a logic 0 is stored at the corresponding address in the flag RAM 314. In the next write cycle for the channel, the signal BPU=0 is latched in the latch 415 and produces the signal $\overline{\text{FLAG}}=0$, and the packet number is latched in the BPL 410. The assignment controller 119 produces the signal $\overline{\text{TR}}=1$ for the channel, which via the gate 430 results in the signal $\overline{\text{XMIT}}=1$ to produce the latched signal $\overline{\text{ACTIVE}}=1$. The unit 402 is thus supplied with the signals $\overline{\text{FLAG}}=0$, $\overline{\text{ACTIVE}}=1$, $\overline{\text{XMITM}}=1$, and WRITM=0, in response to which it produces signals as shown in FIG. 6A and signals M64=0, $\overline{\text{S64}}=1$, $\overline{\text{EWR}}=1$, $\overline{\text{EN}}=1$ (so that the buffer 401 is not enabled as already described), and $\overline{\text{NWA}}=1$. As shown, in states 3 and 4 the signal $\overline{\text{ENB}}=0$ to enable the output of the BPL 410 and inhibit the output of the BAM 405 via the gate 424. Consequently the pull-up resistors 435 produce all logic 1s, i.e. the hexadecimal code FF, on the byte address bus 440 and hence at the A input of the ALU 418. The unit 402 controls the ALU 418 to produce at its output F the difference A−1 at this time, so that at the start of state 4 with a 0-to-1 transition of the signal ACLK the decremented byte address 11111110 is latched in the BAL 413. At the same time an arbitrary end address out from the EAM 404 is present at the B input of the ALU 418 and the decremented byte address is latched in the EAL 412, but this is immaterial. In state 4, with the signal $\overline{\text{WRB}}=0$, the CPM 403 is enabled via the gate 422 to store the packet number available on the packet bus 439 from the output of the BPL 410, and the BAM is enabled to store the decremented byte address available on the byte address bus 440 from the output of the BAL 413 which is enabled at this time by the signal $\overline{\text{ST4}}=0$. In each case storage in the RAM 403 or 405 is effected at the address of the relevant channel, constituted by the address ADD and the signal CT2; the gates 423 do not alter the address supplied to the RAM 405 because the signal RFR=0. The unit 402 also produces the signals WRITNW=1 and $\overline{\text{LDPCK}}=0$ during states 3 and 4, as shown in FIG. 6A. The signal WRITNW=1 is stored in the RAM 406 to produce the signal WRITM=1 in the next frame, and the signal $\overline{\text{LDPCK}}=0$ causes a logic 1 to be set in the flag RAM 314 as already described. Thus the processor 301, on reading the signal BPU for the channel, is informed that a new back-up packet number must be stored in the control RAM 313 for the channel, this being done subsequently with consequent setting of the signal BPU in the flag RAM 314 to a logic 0.

In the next and subsequent frames the unit 402 is supplied with the signal WRITM=1 instead of the signal WRITM=0. In response to this change the unit 402 supplies the signal $\overline{EN}$=0 to the decoder 420, so that one of the signals $\overline{CASX}$=0 is produced to address and enable the buffer 401. The unit 402 also produces the signal $\overline{ENB}$=1 to inhibit the output of the BPL 410, to inhibit writing into the CPM 403 and to enable its output, and in states 1 to 3 to enable the output of the BAM 405. Consequently, during states 1 and 2 the buffer 401 is addressed and enabled as described above by the packet number and byte address which are read out from the CPM 403 and the BAM 405 respectively, which are in turn addressed for the relevant channel with the address ADD and the signal CT2. With the signal $\overline{WBUF}$=0 as shown in FIG. 5, an 8-bit PCM word present on the lines 437 is stored in the buffer 401 at the addressed location. The PCM word is supplied to the lines 437 from the output of the latch 416, which is enabled at this time by a signal $\overline{ENPCM}$=0 supplied by the unit 402, the word having been previously latched in the latch 416 with a transition of the signal BIT4, from the lines 108 leading from the interface unit 106. As previously, in states 3 and 4 the ALU 418 is controlled to produce the difference F=A−1, A now being the byte address which is supplied from the BAM 405 to the byte address bus 440; the decremented byte address is latched in the BAL 413 and is then stored in the BAM 405, the current packet number stored in the CPM 403 being unchanged. Thus in successive frames the byte address is decremented so that successive PCM words of the channel are stored in successive locations of the relevant packet in the buffer 401, the storage taking place cyclically in the packet as long as the channel remains inactive.

There is a small possibility that a channel may become active within 8 ms after it has become inactive (having been either on-hook or previously active), and that due to the nature of the reading operation described below an end-of-record signal previously stored in the buffer but not relating to the relevant channel could erroneously be read from the buffer and terminate the reading operation. In order to avoid this possibility, the counter 421 and related circuitry is provided to prevent the signal $\overline{XMIT}$ becoming a logic 0 within 8 ms after the signal WRITM has become a logic 1 as described above. As shown, the counter 421 is a 4-bit counter which is cleared by the signal WRITM=0, and with the signal WRITM=1 is enabled to count one pulse of the signal CK every eight frames (signal 8FR) until it reaches its maximum count, when the signal $\overline{ENA}$=0 is produced to inhibit further counting. This counting takes place for each channel, the count of each channel being stored from one frame to the next in the RAM 407. Thus as shown the signal $\overline{ENA}$ becomes a logic 0, enabling the signal $\overline{XMIT}$ to become a logic 0 when the signal $\overline{TR}$ becomes a logic 0, 16 ms after the signal WRITM has become a logic 1. The delay of 16 ms is provided for convenience of implementation with a minimal number of components; the counter 421 could alternatively be replaced by a modulo-65 (or greater) counter which is incremented every frame rather than every eight frames, to provide a delay of at least 8.125 ms.

3. Channel becomes active

Figure 6B:
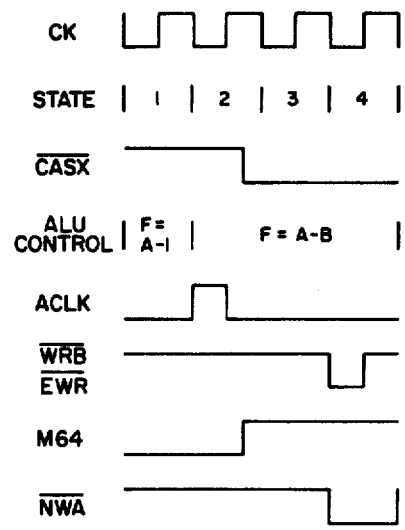

When a channel becomes active and its samples are to be transmitted the assignment controller 119 produces the signal $\overline{TR}$=0 on the line 332, resulting in the signal $\overline{XMIT}$=0 if or when the signal $\overline{ENA}$=0. The unit 402 is thus supplied with the delayed signal $\overline{XMITM}$=1 and the signals $\overline{ACTIVE}$=0 and WRITM=1, in response to which it produces signals as shown in FIG. 6B and signals $\overline{EN}$=0, $\overline{ENPCM}$=0, S64=0, $\overline{LDPCK}$=1, $\overline{ENB}$=1, and WRITNW=1. As previously, the buffer 401 is enabled with one of the signals $\overline{CASX}$=0 and is addressed during states 1 and 2 to store a PCM word which has been latched in the latch 416. As shown in FIG. 6B, during state 1 the ALU 418 is controlled to produce at its output F the difference A−1, i.e. the decremented byte address, which at the start of state 2 is latched in the BAL 413 with the signal ACLK. (This also happens when the channel is inactive as described above, but in that case has no consequence because this same difference is latched again in state 4 as already described.)

During state 3, with the signal M64=1, the output of the EAM 404 is not enabled so that the pull-up resistors 434 produce all logic 1s at the output of this RAM. The second most significant of these bits is changed to a logic 0 by the AND gate 426 with the signal $\overline{S64}$=0, so that the B input of the ALU is supplied with the quantity 10111111, which is equivalent to −64. The BAM 405 supplies the current byte address to the bus 440 at this time, and the ALU 418 is controlled to produce at its output the difference F=A−B, so that at the output of the ALU 418 there is produced an end address which is equal to the current byte address plus 64; this is the same as the byte address 8 ms earlier. At the start of state 4, with the signal ST4, this end address is latched in the EAL 412, whose output is enabled during state 4 with the signal $\overline{NWA}$=0. With the signal $\overline{EWR}$=0 as shown in FIG. 6B, the end address from the EAL 412 is stored in the EAM 404 at the address of the relevant current packet number, which is still present on the packet bus 439 because the output of the CPM 403 is still enabled by the signal $\overline{ENB}$=1. At the same time, the decremented byte address from the BAL 413, whose output is enabled by the signal $\overline{ST4}$=0, is stored in the BAM 405 with the signal WRB=0, at the relevant channel address constituted by the address ADD and the signal CT2.

4. Channel remains active

In subsequent frames, during states 1 and 2 of which writing into the buffer 401 takes place as already described, the unit 402 is supplied with the signals $\overline{ACTIVE}$=0, $\overline{XMITM}$=0, and WRITM=1 as long as the channel remains active. In response to these signals the unit 402 controls the ALU 418 to produce at its output G, during state 2, a signal (A=B) which is supplied to the unit 402 and which is a logic 1 if the A and B inputs of the ALU 418 are equal, and otherwise is a logic 0. If the signal (A=B)=0, then as already described the current byte address on the bus 440 is decremented and the decremented address is stored in the BAM 405, and writing into the same packet continues in the next frame. In this case the unit 402 produces the signals $\overline{ENB}$=1, $\overline{NWA}$=1, $\overline{EWR}$=1, $\overline{S64}$=1, and M64=0.

Figure 6C:
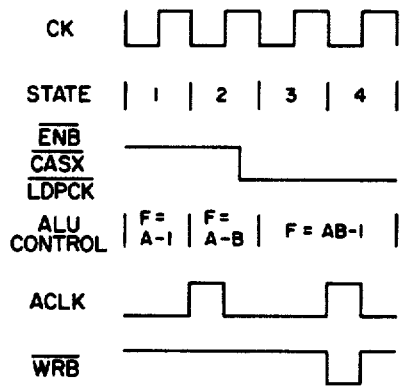

If the signal (A=B)=1, then the current byte address is the end address of the packet, so that writing in the next frame must be into a new packet in order to avoid overwriting of speech samples in the buffer 401. In this case the unit 402 produces signals as shown in FIG. 6C, and the signals $\overline{S64}$=1, $\overline{EWR}$=1, and M64=0. During state 3, in response to the signal $\overline{ENB}$=0 as shown in FIG. 6C, the outputs of the CPM 403 and the BAM 405 are inhibited, so that the pull-up resistors 435 provide all logic 1s on the bus 440 and hence at the A input of the ALU 418. At the same time, the output of the BPL 410 is enabled, so that the back-up packet number is supplied from the BPL 410 to address the EAM 404, whose output is enabled by the signal M64=0. Consequently an arbitrary end address, which is contained in the EAM 404, is supplied to the B input of the ALU 418. The ALU 418 is controlled at this time to produce at its output F the quantity AB−1, i.e. B−1 because the input A is all logic 1s. Thus with the signal ACLK becoming a logic 1 at the start of state 4 the end address of the back-up packet, decremented by 1, is latched in the BAL 413 as a starting byte address for writing into the new packet. With the signal $\overline{\text{WRB}}$=0 this starting byte address is stored in the BAM 405, and at the same time the back-up packet number present on the packet bus 439 is stored in the CPM 403 as a new current packet number. Thus in the next frame, writing takes place in the new packet.

In addition, as shown in FIG. 6C, the unit 402 produces the signal $\overline{\text{LDPCK}}$=0, which as described above results in a new back-up packet being assigned to the channel in due course.

4. Channel goes from active to inactive

When an active channel becomes inactive, the processor 301 in the assignment controller 119 is interrupted as already described and produces the signal $\overline{\text{TR}}$=1, resulting in the signal $\overline{\text{XMIT}}$=1 and $\overline{\text{ACTIVE}}$=1, while the delayed signal $\overline{\text{XMITM}}$=0. In response to these signals, the unit 402 produces the signal WRITNW=0, and the signal $\overline{\text{EN}}$=0 to enable storage of a word in the buffer 401, but inhibits the output of the latch 416 with the signal $\overline{\text{ENPCM}}$=1. Consequently the pull-up resistors 436 supply all logic 1s, i.e. the hexadecimal code FF constituting the end-of-record signal, to the lines 437 and this code is stored in the buffer 401 at the addressed location. The occurrence of this code in normal PCM words is suppressed in the channel banks 105, and/or may be suppressed on the lines 108 by additional circuitry which is not shown. In the next frame the signal $\overline{\text{XMITM}}$=1, and the signal WRITM=0 to clear the counter 421. In response to these signals, the unit 402 produces the signal EN=1, so that the buffer 401 is not enabled for further writing until a new packet has been assigned to the channel. In this case the packet number already contained in the BPL can not necessarily be used as the new packet number, because the back-up packet number may not have been undated since the last occasion when a new packet number was needed while the channel was active. Accordingly, in this instance the unit 402 also produces the signal $\overline{\text{LDPCK}}$=0 to cause a logic 1 to be set in the flag RAM 314, so that subsequently the processor 301 stores a new packet number, which it assigns to the channel, in the control RAM 313 with simultaneous setting of a logic 0 in the flag 314 as already described.

5. Channel goes on-hook

The assignment controller 119 is interrupted and, upon servicing the interrupt, produces the signal $\overline{\text{WRCLR}}$=0 in the command word which is latched in the latch 414, to inhibit further writing of samples into the buffer 401, as already described above.

6. Reading

Reading from the speech buffer 110 is controlled by a bit of the command word which is latched in the latch 414 during the relevant address ADD which, strobed in the gate 427 with the signal ADD LSB, constitutes the signal $\overline{\text{READ}}$. In response to a channel becoming active, the assignment controller produces a channel-to-facility assignment which is transmitted via the order wire, and changes the command word for the assigned facility so that the signal $\overline{\text{READ}}$ changes from a logic 1 to a logic 0. The assignment controller 119 also stores in the control RAM 313, at an address assigned to the facility, the packet number of the first packet in which signal samples of the relevant channel are stored. Thus in the first frame after a channel-to-facility assignment, during the facility address ADD read cycle this first packet number from which reading is to be effected is latched in the BPL 410 and the unit 402 is supplied with the signal $\overline{\text{READ}}$=0 and the delayed signal $\overline{\text{READM}}$=1. It is noted here that as this is a read cycle, as shown in FIG. 5 the signal RDS=0 and the signal WBUF=1.

In response to these signals, the unit 402 produces signals which are substantially as shown in FIG. 6C, with the exception that none of the signals $\overline{\text{CASX}}$=0 is produced, and also produces the signals $\overline{\text{S64}}$=1, $\overline{\text{EN}}$=1, $\overline{\text{EWR}}$=1, PCMCLK=1, and M64=0. Consequently, in a similar manner to that described above in relation to FIG. 6C, the end address of the packet number stored in the BPL 410 is read out from the EAM 404 and decremented in the ALU 418, the decremented end address is latched as a starting byte address in the BAL 413, and with the signal $\overline{\text{WRB}}$=0 the packet number and byte address are stored in the CPM 403 and the BAM 405 respectively. With the signal $\overline{\text{LDPCK}}$=0 a logic 1 is stored in the flag RAM 314 of the assignment controller 119 at the address assigned to the facility, in response to which the processor 301 subsequently stores the number of the next (second) packet into which samples of the channel have been written. As the signals $\overline{\text{CASX}}$=1 and PCMCLK=1, no reading takes place in this frame, the output on the lines 117 connected to the output of the latch 417 being zero because the latch 417 is cleared during state 3 of each read cycle via the gate 441.

Figure 6D:
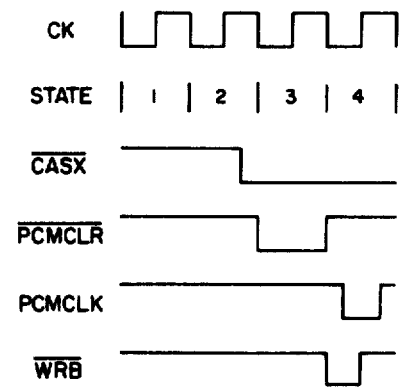

In the next and subsequent frames the unit 402 is supplied with the signals $\overline{\text{READ}}$=0 and the delayed signal $\overline{\text{READM}}$=0, in response to which, as in the case of writing, the current packet number is read from the CPM 403, the byte address is read from the BAM 405, and the buffer 401 is addressed and enabled with one of the signals $\overline{\text{CASX}}$=0, the unit 402 now producing the signal $\overline{\text{EN}}$=0. Thus in each frame a PCM word at the addressed location in the buffer 401 is read out via the lines 438 and via the ROM 409 to the latch 417, and during state 4 of the read cycle is latched in the latch 417 with the signal $\overline{\text{PCM CLK}}$, the latch having been cleared during state 3 with the signal PCM CLR=0. The read-out PCM word is then supplied to the interface unit 106 via the lines 117. FIG. 6D shows signals which are produced in each such read cycle.

As in the case of the write cycles, in state 2 of each read cycle as described above the ALU 418 is controlled to produce the signal (A=B) to determine when the end address of the current packet is reached. As for the write cycles, as long as the signal (A=B)=0 the decremented byte address latched in the BAL 413 is stored in the BAM 405 for reading in the next frame. When the signal (A=B)=1, i.e. when the end address is reached during the reading operation, in exactly the same manner as in the writing operation described above the back-up packet number is stored in the CPM 403, and the decremented end address of this packet is stored in the BAM 405, for reading in the next frame.

Thus reading from the packets takes place sequentially in the same manner as writing into the packets, until the end-of-record signal is detected as described below.

The ROM 409, via which PCM words are supplied from the buffer 401 to the latch 417, is enabled during each read cycle by the signal $\overline{RDS}=0$ and is controlled by the unit 402, in response to a bit of the command word supplied by the assignment controller 119 and latched in the latch 414, optionally to provide a 3 dB attenuation of the signals read out to any particular facility. The ROM 408 is likewise controlled by the unit 402, under the control of bits of the command word supplied by the assignment controller 119, optionally to supply test signals such as tones which during write cycles can be stored in an unused packet of the buffer 401 and which subsequently can be read from the buffer 401 during read cycles in order to check the proper functioning of the buffer 401.

When the end-of-record signal, hexadecimal code FF, is read out from the buffer 401 at the end of a speech burst, this is detected by the gate 431 to produce at the output of the gate 432 the signal $\overline{EOR}=0$. This signal inhibits the gate 433 so that no signal $\overline{WRB}=0$ is produced, with the consequence that the packet number and byte address stored in the CPM 403 and the BAM 405 are not updated. This situation continues until the signal $\overline{READM}$, supplied to the gate 432, becomes a logic 1. The logic 0 output of the gate 431 is used to inhibit the production of the signal PCM CLK as shown in FIG. 6D, this signal remaining a logic 1. The change in the signal $\overline{EOR}$ from 1 to 0 on detection of the end-of-record code results in an interrupt to the processor 301 in the assignment controller 119 as already described. On servicing this interrupt, the processor 301 changes the command word for the particular facility to terminate reading with the signal $\overline{READ}=1$, the signal $\overline{READM}=1$ being produced in consequence one frame later.

7. Refresh

As already mentioned, the contents of the buffer 401 must be periodically refreshed in order to avoid a loss of information stored in the buffer. This is effected as follows. In each refresh cycle, the signal RFR = 1. The unit 402 produces the signals $\overline{EN}=1$, $\overline{LDPCK}=1$, ENB = 1, $\overline{EWR}=1$, $\overline{NWA}=1$, and M64 = 0, and controls the ALU 418 to produce at its output F the difference A-1 during states 1, 3, and 4. In consequence, no signal $\overline{CASX}=0$ is produced, and via the gate 425 the multiplexer 419 is controlled to supply to the buffer 401 continuously throughout states 1 to 3 7 bits of a byte address which is supplied by the BAM 405, whose output is enabled during these states by the signals ENB = 0 and ST4 = 0. As shown in FIG. 4B, the buffer output lines 438 are coupled to the buffer input lines 437 to enable a refresh operation in the buffer. Such a refresh operation is thus effected throughout the buffer 401 for each location which is addressed by the 7 bits of the byte address supplied via the multiplexer 419.

The byte address read out from the BAM 405 is an arbitrary address in any individual cycle, which is read out from one of four locations in the BAM 405. One of these four locations is addressed in each refresh cycle by the signal RFR = 1 being applied directly to three address inputs, and indirectly via the gates 423 to another four address inputs, of the BAM 405, the signal CT2 = 0 being applied to another address input of the BAM 405, and the two least significant bits of the address ADD being applied to the remaining two address inputs of the BAM 405. In the same manner as occurs in the writing and reading operations, the arbitrary byte address read out from the BAM 405 in each refresh cycle is decremented, during state 3, in the ALU 418, and the decremented byte address is latched in the BAL 413 at the start of state 4 with the signal ACLK and is stored as a new byte address in the BAM 405 with the signal $\overline{WRB}=0$ during the first half of state 4. Thus the byte address, at each of the four locations of the BAM 405 referred to, is cyclically decremented so that all parts of the buffer 401 are refreshed in turn. The four locations of the BAM 405 are used because this provides the necessary refresh rate for the buffer 401 and involves the use of only four gates 423. Alternatively 6 gates 423 could be provided, via which each of the 6 bits of the address ADD could be supplied to the respective 6 address inputs of the BAM 405, the signal CT2 = 0 still being applied directly to the BAM 405. In this case only one location of the BAM 405 would be addressed during the successive refresh cycles, resulting in a more rapid refresh rate for the buffer 401.

Figure 7A:
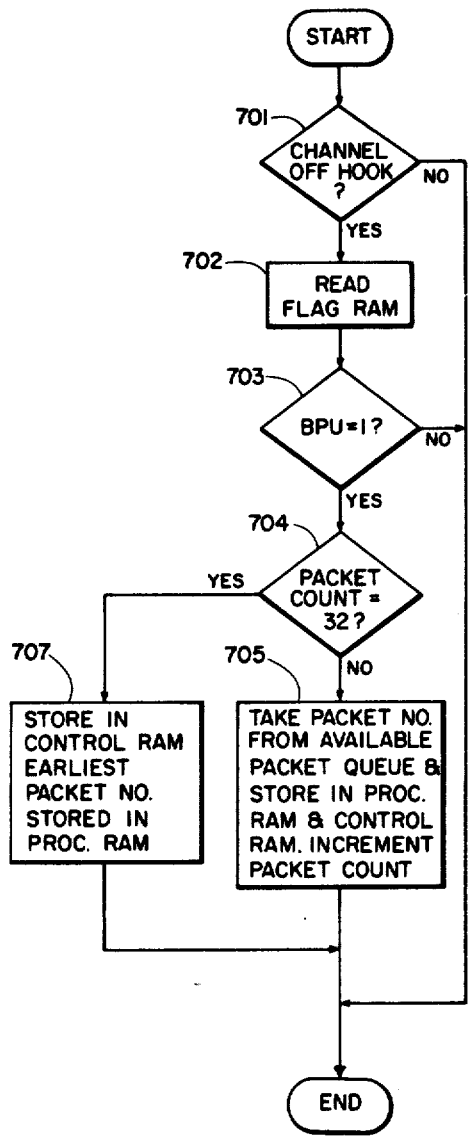
FIGS. 7A and 7B show flow charts relating to the operation of the assignment controller.

From the above description it will be appreciated that the assignment controller 119 must continuously keep track of which of the 256 packets of the buffer are assigned to the channels for storing speech signals or as back-up packets, which are being read out to the facilities or are to be provided as back-up packets for reading out to the facilities, and which are available for assignment to the channels as required. To this end the processor 301 stores in its RAM 303 a queue of packet numbers which are available for assignment to channels requiring them, referred to as an available packet queue; for each channel, a queue of packet numbers assigned to the channel (generally the packets assigned to an individual channel will not be sequential packets of the buffer), together with a packet count representing the number of packets assigned to the channel; and for each assigned facility, the number of the packet which is currently being read out to the facility. Furthermore, as already described the control RAM 313 stores the back-up packet number for each channel and facility. All of this information is constantly updated by the processor 301 in a manner which is described below with reference to FIGS. 7A and 7B, which are simplified flowcharts relating to the operation of the processor 301 in this respect. FIG. 7A relates to the assignment of packets to each channel for storing signals, and FIG. 7B relates to the assignment of packets to each facility for reading out speech signals to the facilities.

Referring to FIG. 7A, for each channel which is off-hook, as determined in a block 701, in a block 702 the flag RAM 314 is periodically read via the buffer 312 as already described. If the signal BPU is not a logic 1, as determined in a block 703, no new back-up packet is required and no action is taken. If the signal BPU = 1, i.e. if a new back-up packet is required, then in a block 704 it is determined whether the packet count of the channel is 32. Assuming that it is not, as will normally be the case, then in a block 705 a packet number is taken from the available packet queue and is stored in the control RAM 313 as a new back-up packet number, and is also stored in the processor RAM 303 as being assigned to the channel, and the packet count of the channel is incremented. With the storage of the new back-up packet number in the control RAM 313, a logic 0 is automatically stored in the flag RAM 314, i.e. the signal BPU is set to a logic 0, as already described.

If at block 704 it is determined that the packet count is 32, i.e. that more than 1 second of speech signals is already stored in the buffer 401, then no further packets are assigned to the channel and overwriting of speech signals may take place, the oldest stored signals being overwritten. In this case in a block 707 the control RAM 313 is supplied with the earliest packet number stored for the channel in the processor RAM 303; this packet which stores the oldest stored signals thus constitutes the new back-up packet for the channel. In this case the packet count remains unchanged. Again the signal BPU is automatically set to a logic 0.

Figure 7B:
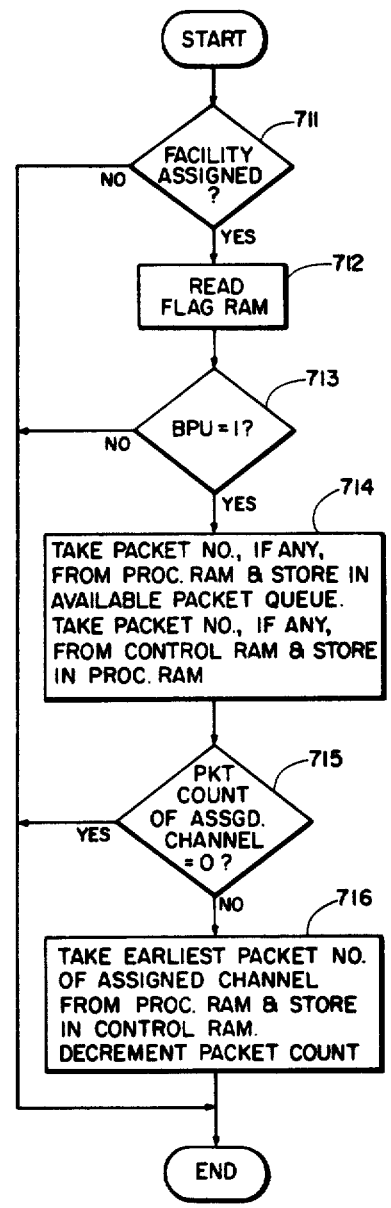

Referring to FIG. 7B, for each facility which is assigned, as determined in a block 711, in a block 712 the flag RAM 314 is periodically read and in a block 713 the state of the signal BPU is determined. If the signal BPU=0, no new back-up packet is required and no action is taken. If the signal BPU=1, then in a block 714 any packet number which has been stored in the processor RAM 303 as the current packet number is stored in the available packet queue so that, having been read, the packet can be reassigned, and any packet number which has been stored in the control RAM 313 as the back-up packet number for the facility is stored in the processor RAM 303 as the new current packet number for the facility. In a block 715 it is then determined whether the packet count of the channel assigned to the facility is zero. If so, then no new back-up packet number is available for the facility and no further action is taken. If not, then a new back-up packet is available for the facility. In this case in a block 716 the earliest packet number for the channel assigned to the facility is taken from the processor RAM 303 and is stored in the control RAM 313 as the new back-up packet number for the facility, and the packet count for the channel is decremented. As before the signal BPU=0 is automatically set in the flag RAM 314 for the facility.

Although not shown in FIG. 7B, it is observed that in response to detection of the end-of-record signal in the signals read out from the buffer 401 for any facility, any packet numbers stored in the processor RAM 303 and in the control RAM 313 for the facility are returned to the available packet queue.

Figure 8:
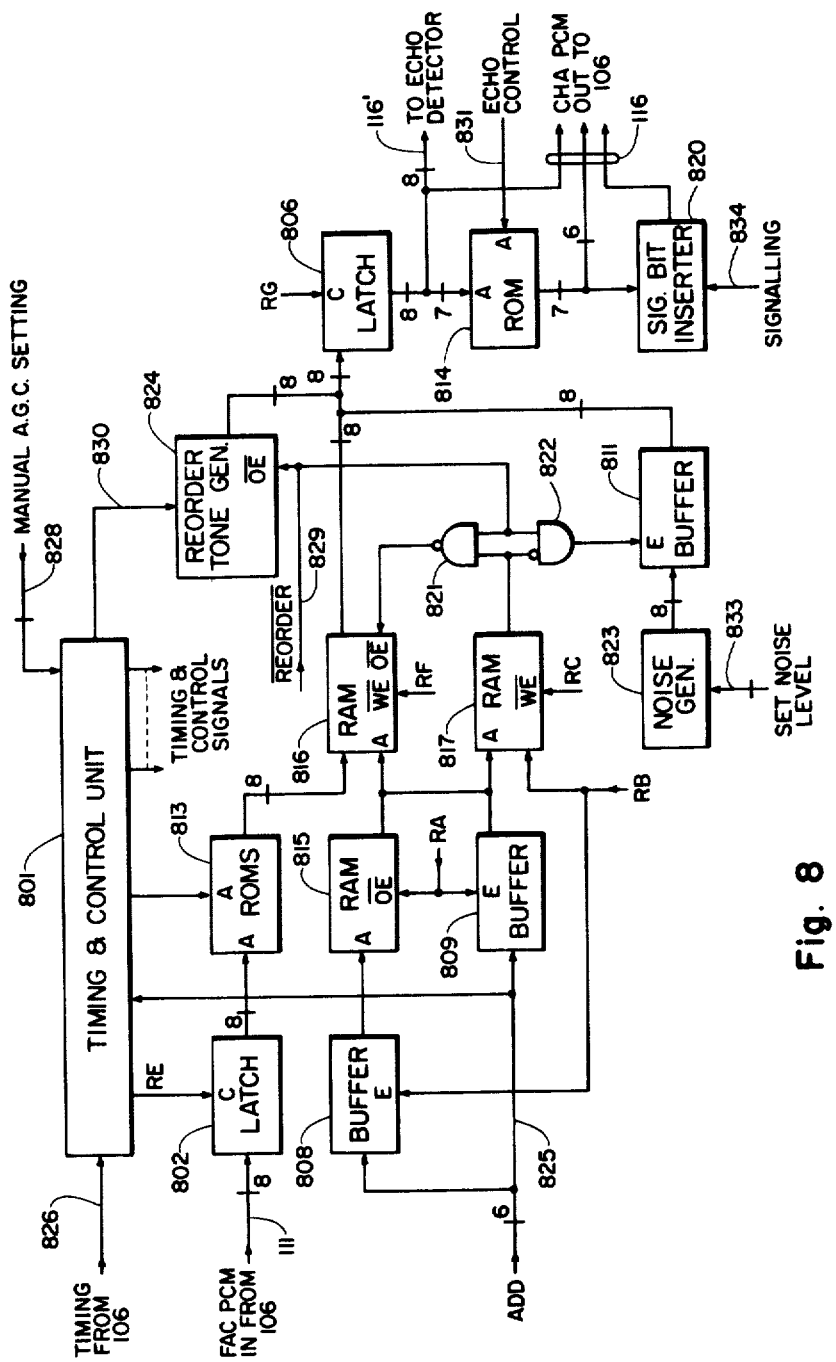
FIG. 8 illustrates part of a receiver of the system.
Figure 9:
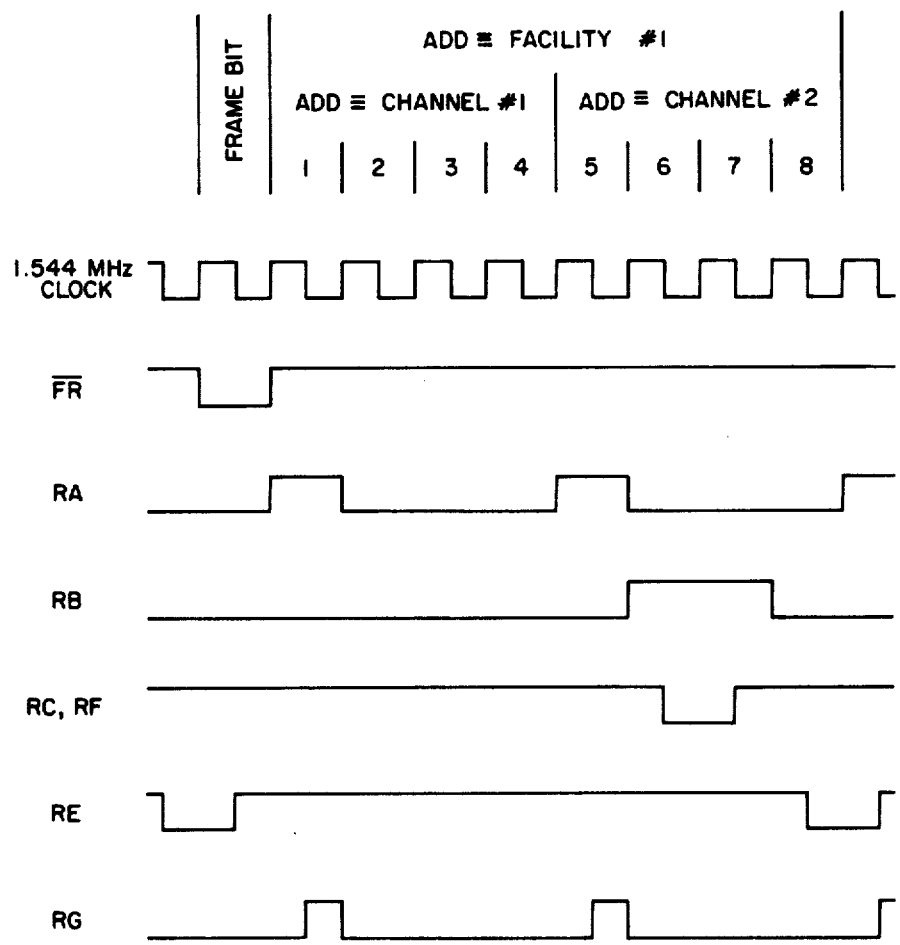
FIG. 9 shows timing signals relating to the operation of the receiver.

Parts of the receiver 112 are shown in detail in FIG. 8, and timing signals which occur in operation of the receiver 112 are shown in FIG. 9. The receiver 112 comprises a timing and control unit 801; latches 802 and 806 each having a clock input C; buffers 808, 809, and 811 each having an enable input E; two read-only memories (ROMs) 813, shown in a single block, and a further ROM 814 having address inputs A; random access memories (RAMs) 815 and 817 having write-enable inputs WE, address inputs A, and output enable inputs OE; a signalling bit inserter 820; gates 821 and 822; a noise generator 823; and a reorder tone generator 824 having an output enable input OE.

The timing and control unit 801 is supplied with the address ADD on lines 825 and with timing signals from the interface unit 106 via lines 826, and produces the various timing and control signals RA, RB, RC, RE, RF, and RG shown in FIG. 9. The timing signals on the lines 826 include a 1.544 MHz clock signal and a signal FR shown at the top of FIG. 9, where the identity of the addresses ADD is also indicated. The signal FR=0 identifies the frame bit of each 193-bit, 125 μs frame on the lines 107 and 115. The unit 801 also supplies addresses to the ROMs 813 for the purposes described below.

In operation, for each facility identified by the address ADD, the RAM 815 stores the number or address ADD of the channel which is temporarily assigned to the facility. For each channel identified by the address ADD, the RAM 817 stores a logic 1 if the channel is active or a logic 0 if the channel is not active. This stored information is updated in a manner which is not described here, but is fully described in co-pending U.S. patent application Ser. No. 218,683, filed Dec. 22, 1980, entitled "TASI System Including an Order Wire" filed simultaneously herewith, the disclosure of which is incorporated herein by reference.

Under the control of the signal RE, for each facility identified by the address ADD a PCM word, the 8 bits of which are available in parallel on the lines 111, incoming from the facility via the interface unit 106 is latched in the latch 802 and applied to address inputs of the ROMs 813. As already explained, the ROMs 813 comprise two ROMs, one of which serves to provide an optional 3 dB attenuation and the other serves to provide an automatic gain control (A.G.C.) of the PCM words. The A.G.C. can be set manually by signals applied to the unit 801 via lines 828.

The resultant 8-bit PCM word produced at the output of the ROMs 813 is stored in the RAM 816 with the signal RF=0 applied to its write enable input $\overline{WE}$. As shown in FIG. 9, at this time the signal RA=0 to enable the output of the RAM 815, the buffer 809 not being enabled, and the signal RB=1 to enable the buffer 808, so that the facility number constituted by the address ADD present on the lines 825 is conducted via the buffer 808 to address the RAM 815 to read out therefrom the address of the channel currently assigned to the facility, this address constituting an address for both the RAM 816 and the RAM 817. Thus for each facility, in each 125 μs frame, a PCM word is written into the RAM 816 at the address of the channel assigned to the facility, and at the same time with the signals RB=1 and RC=0 a logic 1 is stored in the RAM 817 to indicate that the channel assigned to the facility is active.

During the first 1.544 MHz clock period that the address ADD identifies each of the 48 channels, as shown in FIG. 9 the signal RA=1 so that the output of the RAM 815 is not enabled but the buffer 809 is enabled to supply the address ADD from the lines 825 to address the RAMs 816 and 817. If a signal $\overline{REORDER}$ supplied on a line 829 is a logic 0, the output of the reorder tone generator 824, which is supplied with an 8 kHz clock signal from the unit 801 via a line 830, is enabled to supply an 8-bit word forming part of a reorder tone to the latch 806; in addition, the gates 821 and 822 are inhibited, so that neither the buffer 811 nor the output of the RAM 826 is enabled. If the signal $\overline{REORDER}$=1, the output of the generator 824 is not enabled, and via the gates 821 and 822 either the output of the RAM 816 or the buffer 811 is enabled depending upon whether or not, respectively, a logic 1 is read out of the RAM 817 indicating that the channel is active. Thus in respect of an active channel the PCM word stored in the RAM 816, and in respect of an inactive channel an 8-bit word forming part of a noise signal generated by the noise generator 823 and passed through the buffer 811, is supplied to the latch 806. The level of noise generated by the generator 823 can be controlled manually by signals applied to the generator 823 via lines 833.

With the signal RG=1, the relevant 8-bit word supplied to the latch 806 is latched therein and is supplied to the echo detector via the lines 116' as already described. In addition, the sign bit of the word is supplied directly, the 6 most significant bits of the word are supplied via the ROM 814, and the least significant bit is supplied via the ROM 814 and the signalling bit inserter 820, to the lines 116 leading to the interface unit 106. The ROM 814 is controlled by the echo detector via a line 831 to provide a 6 dB attenuation in the event that an echo signal is detected in respect of the particular channel. The signalling bit inserter 820 serves in known manner to insert channel signalling bits, which are supplied via the order wire, modem 104, signalling unit 114 and parts of the receiver 112 not shown in FIG. 8 to a line 834, in place of the least significant bits of PCM words in superframes each of 12 125 µs frames of the channel signals. Having described and shown in detail a particular embodiment of the invention, it will be apparent to those skilled in the art that numerous variations, adaptations, and modifications can be made to this without departing from the scope of the invention as defined in the claims.

What is claimed is:

1. A method of buffering speech signals in a TASI system in which speech signals from a plurality of channels are interpolated for transmission via a lesser plurality of facilities, comprising, for each channel which is active, the steps of:
   providing storage packets of a buffer as required for storage of signals of the channel;
   storing signals of the channel sequentially in said packets; and
   upon assignment of a transmission facility to the channel for transmission of the signals of the channel, reading the signals of the channel sequentially from said packets for transmission via the facility.

2. A method of buffering speech signals in a TASI system in which speech signals from a plurality of channels are interpolated for transmission via a lesser plurality of transmission facilities, comprising the steps of:
   providing a buffer comprising storage packets each for storing a plurality of speech signals of a channel;
   determining, for each channel, when the channel has become active and when the channel has become inactive;
   assigning packets of the buffer to each active channel as required for the storage of signals of the channel, and storing the signals of the channel sequentially in said packets until it is determined that the channel has become inactive;
   in response to determination that a channel has become active, assigning the channel to a transmission facility for transmission of signals of the channel via the facility;
   in response to the assignment of a channel to a facility, reading the signals of the channel sequentially from the packets of the buffer assigned to the channel, for transmission via the facility; and
   de-assigning the packets of the buffer from the channels in response to reading of the signals of the channels therefrom.

3. A method as claimed in claim 2 and comprising the steps of:
   in response to determination that a previously active channel has become inactive, storing an end-of-record signal sequentially following the last signal of the channel stored in said packets assigned to the channel;
   detecting the end-of-record signal on reading the signals of the channel sequentially from the packets of the buffer; and
   terminating the reading of the signals of the channel in response to such detection.

4. A method as claimed in claim 2 and further comprising the step of determining, for each channel, whether the channel is off-hook;
   wherein the steps of assigning packets of the buffer and storing signals in said packets comprise the steps of:
   in response to determination that a channel has become off-hook, assigning a packet of the buffer to the channel and storing signals of the channel sequentially and cyclically in said packet; and
   in response to determination that the channel has become active, producing an address which identifies a location in said packet at which a signal of the channel has been stored, continuing to store signals of the channel sequentially in the packet until said location is reached, and then storing signals of the channel sequentially in further packets assigned to the channel as required;
   and wherein said reading of the signals of the channel is effected sequentially from said location.

5. A method as claimed in claim 4 wherein the step of producing an address in response to determination that a channel has become active comprises producing an address which identifies a location in the respective packet at which a signal of the channel was stored a predetermined time before such determination.

6. A method as claimed in claim 2, 3, or 4 wherein the step of assigning packets of the buffer to the channels comprises the steps of:
   in response to each assignment of a packet to a channel, providing another, back-up, packet for assignment to the channel; and
   assigning the back-up packet to the channel when a new packet is required to be assigned to the channel.

7. A method as claimed in claim 2 wherein the step of assigning packets of the buffer to each active channel comprises the step of limiting the total number of packets which are assigned to each particular active channel to a predetermined number.

8. A method of buffering speech signals in a TASI system, comprising:
   assigning a respective storage packet of a buffer to each channel having signals to be buffered;
   storing signals of the channels in the assigned packets;
   in response to each assignment of a packet to a channel, providing another, back-up, packet for assignment to the channel;
   assigning the back-up packet to the channel when another packet is required for continued storage of speech signals of the channel;
   in response to assignment of a transmission facility to a channel for transmission of signals of the channel, reading the signals of the channel from the packets assigned to the channel for transmission via the facility; and
   de-assigning the packets from the channels in response to reading of the signals of the channels therefrom.

9. A method as claimed in claim 8 wherein in respect of each channel the steps of providing and assigning back-up packets comprise the steps of:
   providing a flag in a first store;

in response to the flag having a first state, storing the identity of a packet, which is to constitute a back-up packet for the channel, in a second store and simultaneously setting the flag to a second state; and when another packet is required for the storage of signals of the channel, provided that the flag in the first store has the second state, assigning the back-up packet whose identity is stored in the second store to the channel and setting the flag to the first state.

10. A TASI system in which speech signals from a plurality of channels are interpolated for transmission via a lesser plurality of transmission facilities, said system comprising:

a buffer comprising storage packets each for storing a plurality of speech signals of a channel;

detecting means for determining, for each channel, when the channel has become active and when the channel has become inactive;

means for assigning packets of the buffer to each active channel as required for the storage of speech signals of the channel, and for storing the speech signals of the channel sequentially in said packets until the channel has become inactive;

means responsive to detection that a channel has become active for assigning the channel to a transmission facility for the transmission of speech signals of the channel via the facility, and for transmitting information representing the channel-to-facility assignment; and means responsive to the assignment of a channel to a facility for reading the speech signals of the channel sequentially from the packets of the buffer assigned to the channel and for transmitting them via the facility.

11. A TASI system as claimed in claim 10 and including:

means responsive to the detecting means determining that a previously active channel has become inactive for storing an end-of-record signal sequentially following the last signal of the channel stored in said packets assigned to the channel; and further detecting means for detecting the end-of-record signal in the signals of the channel read from the packets of the buffer and terminating said reading in response to such detection.

12. A TASI system in which speech signals from a plurality of channels are interpolated for transmission via a lesser plurality of transmission facilities, said system comprising:

detecting means for detecting, for each off-hook channel, whether the channel is active or inactive;

a buffer comprising a substantially greater number of storage packets than there are channels, each storage packet being capable of storing all of the signals of one channel which occur during a predetermined period;

means for storing the signals of each channel which is inactive in a respective packet of the buffer, said signals being stored sequentially and cyclically in said packet;

means responsive to the detecting means detecting that a channel which has been inactive has become active for producing an address which identifies a location in said respective packet at which a signal of the channel has been stored; for continuing to store signals of the channel sequentially in said respective packet until said location is reached, and for subsequently storing the signals of the channel sequentially in further packets of the buffer;

means responsive to the detecting means detecting that a channel which has been active has become inactive for storing an end-of-record signal sequentially following the last signal of the channel stored in said packets;

means responsive to the detection that the channel has become active for assigning the channel to a transmission facility for transmission of signals of the channel via the facility, and for transmitting information representing the channel-to-facility assignment;

means responsive to the assignment of the channel to the facility for reading the stored signals of the channel sequentially from the respective packets of the buffer, commencing from said location, and for transmitting them via the facility; and means for detecting the end-of-record signal in the signals read from the buffer and for terminating the reading of signals from the buffer and the transmission of said signals via the facility in response to detection of the end-of-record signal.

13. A TASI system as claimed in claim 12 and comprising:

a first random access memory for storing an address of the storage packet (current packet) of the buffer into which the signals of each off-hook channel are currently being entered; and a second random access memory for storing an address of the next packet (back-up packet) into which the signals of each off-hook channel which is active will be entered when no more signals can be stored sequentially in the current packet of the channel;

wherein the means for storing the signals of each off-hook channel comprises means for reading the current packet address of the channel from said first memory and for addressing the buffer with said address; means for detecting when a further packet is required for the continued sequential storage of the signals of a channel and, in response to such detection, for entering the back-up packet address of the channel from said second memory into said first memory as a new current packet address of the channel; and means responsive to the entry of the back-up packet address of the channel into said first memory for storing a new back-up packet address for the channel in said second memory.

14. A TASI system as claimed in claim 13 and comprising a third random access memory for storing a flag in respect of each channel, wherein in respect of each channel:

said means for storing a new back-up packet address in said second memory is responsive to the flag having a first state to effect such storage and simultaneously to set the flag to a second state; and the means for entering the back-up packet address from the second memory into the first memory is arranged to effect such entry only when the flag has the second state, and is arranged to set the flag to the first state upon such entry.

15. A TASI system as claimed in claim 13, wherein said first and second memories are also arranged to store a current packet address and a back-up packet address, respectively, in respect of each facility via which the signals of a channel are being transmitted, the means for reading the stored signals of a channel sequentially from the respective packets of the buffer comprising means for reading the current packet address, of the facility to which the channel is assigned, from said first memory and for addressing the buffer with said address.

16. A TASI system as claimed in claim 12 wherein said predetermined period is substantially greater than a typical response time of the detecting means, and wherein said means responsive to the detecting means detecting that a channel has become active for producing an address is arranged to produce an address which identifies a location in the respective storage packet at which a signal of the channel was stored a predetermined time, greater than said typical response time, before such detection.

17. A TASI system as claimed in claim 16 wherein said predtermined period is about 32 ms and said predetermined time is about 8 ms.

* * * * *